US008533266B2

(12) United States Patent
Koulomzin et al.

(10) Patent No.: US 8,533,266 B2
(45) Date of Patent: Sep. 10, 2013

(54) USER PRESENCE DETECTION AND EVENT DISCOVERY

(75) Inventors: Daniel George Koulomzin, Jamaica Plain, MA (US); Christopher Richard Wren, Arlington, MA (US); Daniel R. Sandler, Watertown, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/565,403

(22) Filed: Aug. 2, 2012

(65) Prior Publication Data

US 2013/0212176 A1 Aug. 15, 2013

Related U.S. Application Data

(60) Provisional application No. 61/598,771, filed on Feb. 14, 2012.

(51) Int. Cl.
*G06F 15/16* (2006.01)
*G06F 12/00* (2006.01)

(52) U.S. Cl.
USPC .......................................... 709/204; 709/203

(58) Field of Classification Search
CPC ........................................................ G06F 15/16
USPC ......................................... 709/202–205, 250
See application file for complete search history.

(56) References Cited

U.S. PATENT DOCUMENTS 7,856,373 B2 12/2010 Ullah
7,945,653 B2 5/2011 Zuckerberg et al.
8,150,915 B1 * 4/2012 Raman et al. ................. 709/203
2004/0102921 A1 5/2004 Tovinkere et al.
2004/0236850 A1 11/2004 Krumm et al.
2006/0007315 A1 1/2006 Singh
2006/0046709 A1 3/2006 Krumm et al.
2006/0146765 A1 7/2006 Van De Sluis et al.
2007/0165554 A1 7/2007 Jefferson et al.

(Continued)

FOREIGN PATENT DOCUMENTS

EP 2278780 A1 1/2011
EP 2500854 A1 9/2012
GB 2486548 A 6/2012
WO 2009155039 A1 12/2009

OTHER PUBLICATIONS

Covell et al., "Waveprint: Efficient wavelet-based audio fingerprinting", Pattern Recognition, vol. 44, issue 11, Nov. 2008, 3 pp.

(Continued)

*Primary Examiner* — Zarni Maung
(74) *Attorney, Agent, or Firm* — Shumaker & Sieffert, P.A.

(57) ABSTRACT

In one example, a method includes receiving a first group of indications associated with a first group of modalities and a second group of indications associated with a second group of modalities. The method also includes determining a confidence value for at least one modality of the first or second groups of modalities based at least in part on an indication associated with the at least one modality. The confidence value may indicate a likelihood that a first user associated with the first remote computing device is within a physical presence of a second user associated with the second remote computing device. The method may also include, performing an operation to indicate that the first user associated with the first remote computing device is within a physical presence of the second user associated with the second remote computing device.

30 Claims, 7 Drawing Sheets

(56) References Cited

U.S. PATENT DOCUMENTS

| | | | | |
|---|---|---|---|---|
| 2007/0167136 | A1 | 7/2007 | Groth | |
| 2007/0255695 | A1 | 11/2007 | Hu et al. | |
| 2007/0255785 | A1 | 11/2007 | Hayashi et al. | |
| 2008/0194270 | A1 | 8/2008 | Greenberg | |
| 2008/0214235 | A1 | 9/2008 | Sagou et al. | |
| 2008/0278438 | A1 | 11/2008 | Brown et al. | |
| 2009/0093272 | A1* | 4/2009 | Saarisalo et al. | 455/558 |
| 2009/0181653 | A1 | 7/2009 | Alharayeri | |
| 2009/0185763 | A1 | 7/2009 | Park et al. | |
| 2010/0103277 | A1 | 4/2010 | Leebow | |
| 2010/0124906 | A1 | 5/2010 | Hautala | |
| 2010/0194896 | A1 | 8/2010 | Heimendinger | |
| 2010/0277611 | A1 | 11/2010 | Holt et al. | |
| 2010/0310134 | A1 | 12/2010 | Kapoor et al. | |
| 2010/0325218 | A1 | 12/2010 | Castro et al. | |
| 2011/0022529 | A1 | 1/2011 | Barsoba et al. | |
| 2011/0043437 | A1 | 2/2011 | Tang et al. | |
| 2011/0072015 | A1 | 3/2011 | Lin et al. | |
| 2011/0142016 | A1 | 6/2011 | Chatterjee | |
| 2011/0207402 | A1* | 8/2011 | Perkins et al. | 455/41.1 |
| 2011/0303741 | A1* | 12/2011 | Bolton et al. | 235/375 |
| 2012/0214411 | A1* | 8/2012 | Levy | 455/41.1 |
| 2012/0215617 | A1* | 8/2012 | Shah et al. | 705/14.35 |
| 2012/0250950 | A1 | 10/2012 | Papakipos et al. | |

OTHER PUBLICATIONS

Raja, "Wi-Fi Indoor Positioning System (Wi-Fi IPS)" [online], retrieved from: <http://sites.google.com/site/monojkumarraja/academic-projects/wi-fi-indoor-positioning-system>, first accessed on Oct. 11, 2011, 4 pps.

Kapoor et al., "Probabilistic Combination of Multiple Modalities to Detect Interest", Proceedings of the 17th International Conference on Pattern Recognition, vol. 3, Aug. 2004, retrieved from: <http://affect.media.mit.edu/pdfs/04.kapoor-picard-ivanov.pdf>, 4 pp.

Krumm et al., "The NearMe Wireless Proximity Server", UbiComp 2004. The Sixth International Conference on Ubiquitous Computing, Sep. 7-10, 2004, retrieved from: <http://research.microsoft.com/en-us/um/people/kenh/ papers/NearMe.pdf>, 18 pp.

An, PowerPoint Presentation, "Hierarchical Mixture of Experts," Machine learning reading group, Duke University, Jul. 15, 2005, 23 pp.

Benson et al., "Event Discovery in Social Media Feeds," Computer Science and Artificial Intelligence Laboratory, Massachusetts Institute of Technology, retrieved at o http://people.csail.mitedu/eob/papers/ac12011-twitter.pdf, 2011, 10 pp.

Bishop et al., "Bayesian Hierarchical Mixtures of Experts," Uncertainty in Artificial Intelligence: Proceedings of the Nineteenth Conference, 2003, retrieved at http://research.microsoft.com/en-us/um/people/cmbishop/downloads/Bishop-UAI-VHME.pdf, 8 pp.

Jacobs et al., "Adaptive Mixtures of Local Experts," Neural Computation 3, retrieved at http://www.cs.toronto.edu/~hinton/absps/jjnh91.pdf, 1991, pp. 79-87.

Jacobs, "Mixtures-of-Experts," Department of Brain & Cognitive Sciences, University of Rochester, retrieved at http://www.bcs.rochester.edu/people/robbie/jacobslab/cheat_sheet/mixture_experts.pdf, Aug. 8, 2008, 5 pp.

Sarma et al., "Dynamic Relationship and Event Discovery," WSDM'11, retrieved from http://web.eecs.umich.edu/~congy/work/wsdm11.pdf, Feb. 9-12, 2011, Hong Kong, China, 10 pp.

Titsias et al, "Mixture of Experts Classification Using Hierarchical Mixture Model," Department of Computer Science, University of Ioannina, Neural Computation, Apr. 2, 2002, 24 pp.

U.S. Appl. No. 13/396,472, by Gulay Birand, filed Feb. 14, 2012.

PBT Consulting, "Apple Files Patent for 'Buddy Finder', a Location-Based Social Network App," retrieved from http://tommytoy.typepad.com/tommy-toy-pbt-consultin/2011/06/apple-files-patent-for-buddy-finder-a-location-based-social-network-app.html, Jun. 19, 2011, 7 pp.

Rahnama, "A Context Aware Ad Hoc Social Network," PowerPoint Presentation, retrieved from https://docs.google.com/viewer?a=v&q=cache:OAmKcFavgLQJ:web.mac.com/hosinux/iWeb/HosinuxWeb/Research/Research_files/Presentation.pdf+&hl=en&gl=us&pid=bl&srcid=ADGEESjNIRFY3mcFVwnohKeM9Eyl_eMg8_gl2b2jtB697IKXhmF-r33r8tTMgsfRu7p7P-qZHnsItMOnAoMuTmApB017GBC9GTAwBD9o98Ei2lnQC1-myhkVsadIDc0fZLg8KSDJXEe5b&sig=AHIEtbRwpCA1iz.

Sarigol et al., "Enabling social networking in ad hoc networks of mobile phones," Systems Group, Department of Computer Science, Microsoft Research, Aug. 24-28, 2009, 4pp.

Combined Search and Examination Report from United Kingdom Patent Application GB1302553.1, dated Mar. 28, 2013, 7 pp.

Office Action from German patent application No. 102013101259.0, dated May 22, 2013, 16 pp.

Bisio et al., "Context-Aware Smartphone Services," In Persuasive Computing Communications Design and Depoloyment: Technologies, Trends and Applications, ed. Apostolos Malaras, 2001, pp. 24-47.

Miluzzo et al., "Sensing Meets Mobile Social Networks: The Design, Implementation and Evaluation of the CenceMe Application," In Proceedings of the 6th Annual Conference on Embedded Network Sensor Systems, Nov. 5-7, 2008, pp. 337-350.

Response to Combined Search and Examination Report dated Mar. 28, 2013, from British patent application No. 1302553.1, filed Jun. 27, 2013, 12 pp.

Revised Office Action from German patent application No. 102013101259.0, dated Jun. 17, 2013, 4 pp.

* cited by examiner

USER PRESENCE DETECTION AND EVENT DISCOVERY

RELATED APPLICATIONS

This application claims the benefit of U.S. Provisional Application No. 61/598,771, filed Feb. 14, 2012, the entire content of which is incorporated herein in its entirety.

BACKGROUND

Computers and mobile devices have become increasingly interconnected due to the widespread availability of wired and wireless connections to communication networks such as the Internet. Users may share information with one another using Internet-based communications. For instance, users that are connected using Internet-based communications may share photos, messages, and other electronic resources with one another. Traditionally, a user would have to know contact information, such as an email address, phone number, social network identifier, of another user in order to share electronic resources with the other person. Obtaining such contact information may be a time consuming process or infeasible if the user wishes to share information with one or more unidentified users that share a common experience with the user.

SUMMARY

In one example, a method includes receiving, by at least one computing device, a first group of indications associated with a first group of modalities and a second group of indications associated with a second group of modalities. The first group of indications may be associated with a first remote computing device and the second group of indications is associated with a second remote computing device. The first and second groups of modalities may be usable to determine whether a first user associated with the first remote computing device is within a physical presence of a second user associated with the second remote computing device. The method also includes determining, by the at least one computing device, a confidence value for at least one modality of the first or second groups of modalities based at least in part on an indication associated with the at least one modality the indication being from the first or second group of indications. The confidence value indicates a likelihood that the first user associated with the first remote computing device is within a physical presence of the second user associated with the second remote computing device. The method also includes, upon determining that the confidence value is greater than a boundary value, performing, by the at least one computing device, an operation to indicate that the first user associated with the first remote computing device is within the physical presence of the second user associated with the second remote computing device.

In another example, a computing device, includes one or more processors. The computing device also includes at least one module operable by the one or more processors to: receive a first group of indications associated with a first group of modalities and a second group of indications associated with a second group of modalities. The first group of indications may be associated with a first remote computing device and the second group of indications may be associated with a second remote computing device. The first and second groups of modalities may be usable to determine whether a first user associated with the first remote computing device is within a physical presence of a second user associated with the second remote computing device. The module may be further operable to determine a confidence value for at least one modality of the first or second groups of modalities based at least in part on an indication associated with the at least one modality, the indication being from the first or second group of indications. The confidence value may indicate a likelihood that the first user associated with the first remote computing device is within a physical presence of the second user associated with the second remote computing. The module may further be operable to, upon determining that the confidence value is greater than a boundary value, determine at least one event based at least in part on a temporal identifier associated with an indication received from at least the first or second remote computing device.

In one example, a computer-readable storage medium may be encoded with instructions that, when executed, cause one or more processors of a first remote computing device to perform operations including: determining a group of indications associated with a group of modalities, wherein the group of modalities is associated with the first remote computing device, and wherein the group of modalities is usable to determine whether a first user associated with the first remote computing device is within a physical presence of a second user associated with the second remote computing device; sending the group of indications associated with the group of modalities to a server device to determine whether the first user associated with the first remote computing device is within a physical presence of the second user associated with the second remote computing device based at least in part on a confidence value for at least one modality of the group of modalities, wherein the confidence value is based at least in part on an indication included in the group of indications; and receiving a message from the server device that indicates whether the first user associated with the first remote computing device is within a physical presence of the second user associated with the second remote computing device.

The details of one or more examples of the disclosure are set forth in the accompanying drawings and the description below. Other features, objects, and advantages will be apparent from the description and drawings, and from the claims.

DETAILED DESCRIPTION

In general, this disclosure is directed to techniques that may use information from a diverse group of modalities to determine whether two or more individuals are in physical proximity to one another, and in some instances, whether the individuals may be associated with the same event. For instance, example modalities may include geo-location, audio-fingerprinting, proximity detection, and calendar data. Each modality may provide some information about the proximity of one individual to another. In some examples, modalities may further indicate an event which may be associated with the individuals. Under different circumstances, different modalities may provide more or less precise information that indicates if individuals are in a physical presence of one another.

In one example, multiple users may be in a physical presence of one another. Moreover, each user may have a mobile computing device such as a smartphone. Each smartphone may provide information associated with one or more modalities to a remote server implementing techniques of the present disclosure. For instance, each smartphone may send information that includes a geoposition of the smartphone and an audio fingerprint that represents a sample of sound received by the smartphone. Using techniques of the present disclosure, the remote server may receive such information associated with the one or more modalities. The remote server may, for information received from each phone, determine the quality and/or margin of error of information associated with each modality. Using techniques of the disclosure, the remote server may weigh the information associated with each modality based at least in part on the quality and/or margin of error of the information. The remote server may determine a confidence value (e.g., a likelihood) that the users associated with the smartphones are within a physical presence one another based on the weighted information associated with the modalities of each smartphone. If the remote server determines, using the using the confidence value, that the users are within a physical presence one another, the remote server may perform additional operations, such as notifying the users of their physical proximity to one another and/or determining whether the users are associated with a common event. By determining that users are in physical proximity and associated with a common event, techniques of the present disclosure may enable users to establish relationships more easily and share content, e.g., using a social networking service, with less effort.

Figure 1:
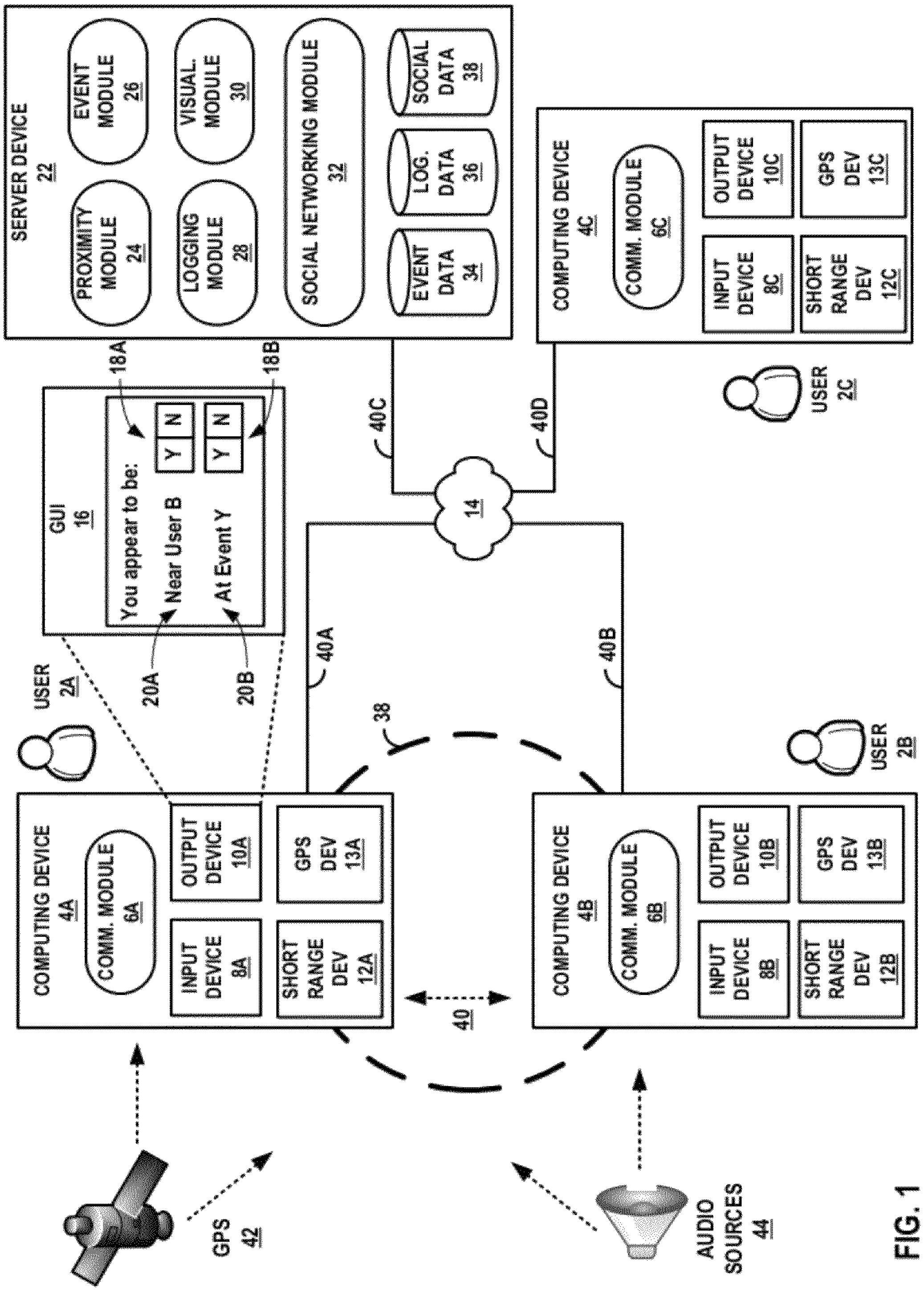
FIG. 1 is a block diagram illustrating example client devices and a server device that may be used to determine whether users associated with computing devices are within a physical presence of one another, in accordance with one or more aspects of the present disclosure.

FIG. 1 is a block diagram illustrating example client devices 4A-4C (collectively referred to as "computing devices 4") and a server device 22 that may be used to determine the proximity of the client devices to one another, in accordance with one or more techniques of the present disclosure. In some examples, each of computing devices 4 may be referred to as a remote computing device. Computing devices 4 may be associated with users 2A-2C (collectively referred to as users 2). For instance, a user associated with a computing device may interact with the computing device by providing various user inputs to interact with the computing device. In some examples, a user may have one or more accounts with one or more services, such as a social networking service and/or telephone service, and the accounts may be registered with the computing device that is associated with the user. As shown in FIG. 1, user 2A is associated with computing device 4A, user 2B is associated with computing device 4B, and user 2C is associated with computing device 4C.

Computing devices 4 may include, but are not limited to, portable or mobile devices such as mobile phones (including smart phones), laptop computers, desktop computers, tablet computers, and personal digital assistants (PDAs). Computing devices 4 may be the same or different types of devices. For example, computing device 4A and computing device 4B may both be mobile phones. In another example, computing device 4A may be a mobile phone and computing device 4B may be a tablet computer.

As shown in FIG. 1, computing device 4A includes a communication module 6A, input device 8A, output device 10A, short-range communication device 12A, and GPS device 13A. Other examples of a computing device may include additional components not shown in FIG. 1. Computing device 4B includes a communication module 6B, input device 8B, output device 10B, short-range communication device 12B, and GPS device 13B. Computing device 4C includes a communication module 6C, input device 8C, output device 10C, short-range communication device 12C, and GPS device 13C.

Computing device 4A may include input device 6A. In some examples, input device 6A is configured to receive tactile, audio, or visual input. Examples of input device 6A may include a touch-sensitive and/or a presence-sensitive screen, mouse, keyboard, voice responsive system, microphone, camera or any other type of device for receiving input. Computing device 4A may also include output device 10A. In some examples, output device 10A may be configured to provide tactile, audio, or video output. Output device 10A, in one example, includes a touch-sensitive display, sound card, video graphics adapter card, or any other type of device for converting a signal into a form understandable to humans or machines. Output device 10A may output content such as graphical user interface (GUI) 16 for display. Components of computing devices 4B and 4C may include similar or the same functionality as described with respect to components of computing device 4A. In some examples, components of computing devices 4B and 4C may include functionality that is different from computing device 4A.

As shown in FIG. 1, computing device 4A includes a short-range wireless communication device 12A. In one example, short-range wireless communication device 12A is capable of short-range wireless communication 40 using a protocol, such as Bluetooth or Near-Field Communication. In one example, short-range wireless communication 40 may include a short-range wireless communication channel. Short-range wireless communication 40, in some examples, includes wireless communication between computing devices 4A and 4B of approximately 100 meters or less. Computing devices 4B and 4C may include short-range communication devices 12B and 12C, respectively, with functionality that is similar to or the same as short-range communication device 12A.

Computing devices 4A-4C may also include Global Positioning System (GPS) devices 13A-13C (collectively referred to as GPS devices 13), respectively. GPS devices 13 may communicate with one or more GPS sources, such as GPS source 42, to obtain geopositions of each respective computing device. GPS source 42 may be a GPS satellite that provides data usable to determine a geoposition. A geoposition may include, for example, coordinates that identify a physical location of the computing device in a GPS mapping system.

For instance, a geoposition may include a latitude coordinate and a longitude coordinate of the current physical location of a computing device.

As shown in FIG. 1, server device 22 may include proximity module 24, event module 26, logging module 28, visualization module 30, social networking module 32, event data 34, logging data 36, and user data 38. Computing devices 4 and server device 22 may be operatively coupled by communication channels 40A-40D, which in some examples may be wired or wireless communication channels capable of sending and receiving data. Examples of communication channels 40A-40D may include Transmission Control Protocol/Internet Protocol (TCP/IP) connection over the Internet or 3G wireless network connection. Network 14 as shown in FIG. 1 may be any network such as the Internet, or local area network (LAN).

Users 2A, 2B, 2C as shown in FIG. 1 may have various shared experiences with one another in different environments. For instance, user 2A may be in physical proximity with user 2B in an environment such that the users may carry on a conversation (e.g., users 2A and 2B are sitting together at a coffee shop). In other examples, user 2A may be in an environment with many different users (e.g., user 2A attends a wedding or conference). In any case, user 2A may wish to easily share content and establish relationships with other users participating in the same shared experience (e.g., the meeting at the coffee shop or the wedding). User 2A may not have the ability easily establish a relationship with other users participating in the shared experience because conventional methods of establishing relationships with other users may require user effort that detracts from participation in the shared experience. Such experiences may prevent or discourage users from quickly and easily sharing content associated with the shared experience.

Techniques of the present disclosure may enable a user participating in a shared experience, such as a common event or being within a physical presence of another user, to determine that other users are participating in the same experience. In some examples, techniques of the disclosure may also improve the ease of connecting with and establishing relationships with other users participating in a shared experience. The techniques may also reduce user effort to share and receive content associated with the shared experience. In this way, techniques of the present disclosure may improve a user's ability to determine who the user is spending time with and what activities the user is engaged in. Techniques of the disclosure may reduce user effort to establish relationships with other user in some examples by automatically determining who a user has spent time with. Techniques of the disclosure may also enable a user to determine who they spent their time with, where they've spent their time, and what activities they were engaged in.

To identify shared experiences, techniques of the present disclosure may determine whether computing devices associated with users are in proximity to one another based on one or more modalities. A modality, generally, may be any source of information usable to determine whether computing devices are in proximity to one another. By comparing information from various modalities associated with each computing device, techniques of the present disclosure may determine that computing devices, and therefore the users associated with the computing devices, are in physical proximity to one another. The techniques may further determine that users in physical proximity to one another are participating in a shared experience (e.g., an event). Upon determining that users are participating in a shared experience, techniques of the disclosure may, for example, notify the users of the shared experience, enable users to establish relationships with other users, share content associated with shared experience, etc.

Referring to FIG. 1, techniques of the present disclosure will now be described with respect to computing devices 4A, 4B, 4C and server device 22. Computing devices 4A-4C may include communication modules 6A-6C. Communication modules 6A-6C may be implemented in hardware, software, or a combination thereof. Each of communications modules 6B-6C may have similar or the same functionality as communication module 6A described herein.

As shown in FIG. 1, communication module 6A may generate one or more indications associated with one or more modalities. For instance, communication module 6A may receive information associated with each modality and generate one or more indications based on the information. Example modalities may include a short-range communication modality, a geoposition (or GPS) modality, an audio source modality, a visual source modality, a calendaring source modality, a check-in source modality, and a network identifier modality. Many other sources of information usable to determine that one computing device is in proximity to another computing device are contemplated within the scope of this disclosure and the modalities described herein should not be understood as an exclusive group of modalities. An indication generated by a communication module and associated with a modality may be data that include information usable to determine whether the computing device that includes the communication module is in physical proximity to another computing device. Computing device 4A may send indications associated with modalities to server device 22.

In one example of generating indications associated with a modality (e.g., short-range wireless communication), communication module 6A may receive information from short-range wireless communication device 12A that computing device 4A has detected computing device 4B using short-range wireless communication. For instance, communication module 6A may receive an identifier of computing device 4B. Alternatively, communication module 6A may receive an identifier that identifiers user 6B, such as a user identifier in a social networking service or information from a vCard such as a name, address, phone number, email address, etc. In any case, communication module 6A may generate one or more indications that indicate computing device 4A has detected computing device 4B and/or user 2B using short-range wireless communication. The indications may further include information that indicates the strength of the short-range wireless communication channel between computing device 4A and computing device 4B. In some examples, the indications may include information that indicates the distance between computing device 4A and computing device 4B.

In another example of generating indications associated with a modality, communication module 6A may receive information from GPS device 13A that indicates a geoposition of computing device 4A. As previously described, a geoposition may indicate one or more coordinates that identify a physical location of computing device 4A. Communication module 6A may generate one or more indications that include geographic identifiers that identify the geoposition of computing device 4A. The indications may further indicate the strength of the communication between GPS device 13A and GPS source 42. In some examples, the indications may indicate the precision or margin of error associated with the geoposition. In one example, geoposition information that includes the geoposition may be associated with an indication generated by communication module 6A.

Communication module 6A may also use modalities including audio and visual sources to generate indications. For instance, communications module 6A may capture ambient audio and/or video signals in an environment surrounding computing device 4A. In one example, input device 8A may be a microphone that receives audio signals, which are then used by communication module 6A to generate indications representing the audio signals. Similarly, in some examples, input device 8A may be a camera that can capture visual signals, which communication module 6A may use to generate indications representing the visual signals. In some examples, additional information such as the quality of the audio and/or visual signals may be included in the indications.

In the example shown in FIG. 1, each of computing devices 4 may send indications associated with various modalities to service device 22. In some examples, each of computing devices 4 may be associated with a unique identifier that identifies the computing device. In the example of computing device 4A, communication module 6A may associate the unique identifier of the computing device with indications that are sent by computing device 4A to server device 22. In this way, server device 22 may determine the identity of each computing device associated with a particular indication.

As shown in FIG. 1, server device 22 may receive a first group of one or more indications associated with modalities from computing device 4A. Server device 22 may also receive second and third groups of modalities from computing devices 4B and 4C. In some examples, server device 22 may continuously receive indications from computing devices according to a time interval or as the indications are generated and sent by the computing devices. As previously described, the modalities and corresponding indications may be usable to determine whether, for example, the users 2A and 2B that are associated with computing devices 4A and 4B within a physical presence of one another.

In some examples, user 2A may be in a physical presence of user 2B when the users are able to physically communicate with one another using speech or sign language. For instance, user 2A may be in a physical presence of user 2B when user 2A is near user 2B such that user 2A can speak or engage in sign language with user 2B without the assistance of wireless communication enabled by computing devices. In some examples, user 2A may be within a physical presence of user 2B when the users are within a predetermined distance. In one example, user 2A may be in the physical presence of user 2B when user 2A is within a 0-5 meter radius of user 2B. In a different example, user 2B may be in a physical presence of user 2B when user 2B is within a 0-20 meter distance. As described herein, techniques of the present disclosure may determine that two or more users are in a physical presence of one another based on multiple, different types of indications that indicate users are engaged in a common social experience including, but not limited to, for example, physical distance, social networking information, event information, etc. Because users 2A and 2B may interact with and/or carry computing devices 4A and 4B on his/her persons, respectively, techniques of the present disclosure may determine that two or more users are in a physical presence of one another using the indications of the computing devices and, in some examples, other sources of information.

Proximity module 24 may implement techniques of the present disclosure to determine whether computing devices are in proximity to one another and consequently determine whether users are in a physical presence of one another. Initially, proximity module 24 may receive indications associated with modalities from computing devices, such as computing devices 4. In some examples, proximity module 24 may determine the unique identifier of the computing device associated with the indication. Upon receiving an indication, proximity module 24 may determine a confidence value for the modality associated with the indication. The confidence value may represent a likelihood that the modality indicates whether, for example, computing device 4A is physically located within a physical presence 38 of computing device 4B. In some examples, a confidence value may be one or more probabilities or other determined values that indicate a likelihood that a modality indicates users of two or more computing devices are within a physical presence of one another.

In accordance with techniques of the disclosure, a confidence value may be based at least in part on the quality and/or precision of the information associated with a modality when determining whether computing devices are in proximity to one another. For instance confidence values may be based on a spectrum of margins of error associated with a modality. For example, as the margin of error for the geoposition increases, the confidence value generated by proximity module 24 for the GPS modality may decrease. Similarly, as the margin of error for the geoposition decreases, the confidence value generated by proximity module 24 may increase. As further described herein, a GPS indication may include a geoposition of computing device 4A and a margin of error for the geoposition, i.e., +/−3 meters (e.g., if computing device 4A is outdoors with an unobstructed path to GPS source 42). In another example, a GPS indication may indicate a margin of error of +/−50 meters (e.g., if computing device 4A is in a building with an obstructed path to GPS source 42). By generating a confidence value using quality and/or precision information, techniques of the present disclosure may provide more precise determinations of whether users associated with two or more computing devices are within a physical presence of one another.

Although the previous example illustrated the use of distance as a margin of error for a GPS modality, any suitable margin of error for GPS may be used. Moreover, indications for other modalities may also include quality and/or margin of error information. For instance, indications of a visual modality may include a resolution, indications of an audio modality may include a frequency range or bit rate, indications of short-range wireless communication may include a distance or signal strength, etc.

Referring now to the example of FIG. 1, proximity module 24 may use indications associated with one or more modalities of computing devices to improve the precision of determining whether users associated with computing devices are within a physical presence of one another. For instance, computing devices 4A and 4B may each send indications associated with GPS, audio source, and short-range wireless communication modalities. As one example, communication module 6A may send indications that include geopositions based on information received from GPS source 42. Communication module 44 may also generate indications based on ambient audio from audio sources 44 using audio signals received from input device 8A. Using short-range wireless communication device 12A, communication module 6A may also generate an indication that includes an identifier of computing device 4B. Communication module 6B may similarly generate indications for the GPS, audio source and short-range wireless communication modalities. Communication modules 6A and 6B may each send the indications to server device 22.

Proximity module 24 may initially receive the indications from server device 22. As will be further described in the examples of FIGS. 1 and 2, proximity module 24 may use indications associated with various modalities from one or more computing devices to determine a confidence value for at least one modality that indicates a likelihood that the at least one modality indicates whether user 2A of computing devices 4A is within physical presence 38 of user 4B. In some examples, proximity module 24 may use margin of error and/or quality information included in the indications to generate the confidence values associated with the various modalities to more precisely determine whether two users of computing devices are within a physical presence of one another. For instance, proximity module 24 may generate a larger confidence value (e.g., indicating a higher likelihood two devices are within a determined distance) for modalities and indications that have higher quality and lower margins of errors. Proximity module 24 may also may generate a smaller confidence value (e.g., indicating a lower likelihood two devices are within a determined distance) for modalities and indications that have lower quality and higher margins of errors.

Referring to the example of FIG. 1, proximity module 24 may determine a confidence value (e.g., a probability) using geopositions of computing devices 4A and 4B that indicate users 2A and 2B are within a physical presence of one another. For example, proximity module 24 may determine the margins of error associated with the geopositions received from the computing devices. By comparing the distance between the geopositions of computing device 4A and 4B, and applying the margins of error associated with the geopositions, proximity module 24 may determine the probability that computing devices 4A and 4B are within a predetermined distance. Generally, increases in the margin of error and distance between the geopositions may result in a lower probability that computing devices 4A and 4B are within the predetermined distance while decreases in the margin of error and distance between the geopositions may result in a higher probability that the devices are within the predetermined distance.

Proximity module 24 may also compare indications associated with audio sources that are received from computing devices 4A and 4B to determine a confidence value that indicates whether users 2A and 2B are within a physical presence of one another. Audio indications may include one or more audio fingerprints, which may identify and/or represent audio signals received by input devices 8 of computing devices 4. In one example, proximity module 24 may perform one or more audio recognition techniques (e.g., audio fingerprinting) to determine a probability that audio indications match. For instance, proximity module 24 may determine a degree of similarity between at least one first audio fingerprint associated with computing device 4A and at least one audio fingerprint received from the computing device 4B. The degree of similarity may be within a range of degrees of similarity. Proximity module 24 may also generate the confidence value based at least in part on quality and/or margin of error information for the audio indications. For example, proximity module 24 may generate lower confidence values for the audio modality when the quality of the audio indications is low. Quality and/or margin of effort information may include a bit rate, frequency range, level of background noise, etc., associated with the audio indications.

Proximity module 24 may also compare identifiers of computing devices 4A and 4B obtained by the respective devices using short-range wireless communication, to determine a confidence value that users 2A and 2B associated with computing devices 4A and 4B are within a physical presence of one another. For instance, computing device 4A may send indications to server device 22 that include an identifier of computing device 4A and an identifier of computing device 4B that was received by computing device 4A using short-range wireless communication. Similarly, computing device 4B may send indications to server device 22 that include an identifier of computing device 4B and an identifier of computing device 4A that was received by computing device 4B using short-range wireless communication. By comparing the similarity, for example, between the identifiers of computing device 4A that are received by server device 22, proximity module 24 may determine the probability that the identifiers match, thereby indicating whether the computing devices are within proximity to one another. Proximity module 24 may generate the confidence value based in part on quality and/or margin of error information. Such information may include signal strength of the short-range wireless communication between computing devices 4A and 4B.

Upon generating confidence values for each of the modalities (e.g., GPS, audio, short-range wireless communication) associated with indications, proximity module 24 may determine that the computing devices 4A and 4B are within physical presence 38 of one another. For instance, as further described in FIG. 2, proximity module 24 may weight each of the modalities by applying the confidence values to the indications associated with each of the respective modalities. In one example, proximity module 24 may sum the confidence values and determine if the sum is greater than a predefined value. If the sum is greater than the predefined value, proximity module 24 may determine that users 2A and 2B of computing devices 4A and 4B are within a physical presence 38 of one another. In another example, proximity module 24 may determine whether each confidence value is greater than a corresponding predefined value. If a confidence value associated with a modality is less than a corresponding predefined value, proximity module 24 may ignore the confidence value associated with the modality. Consequently, in such examples, only confidence values that are greater than corresponding predefined values are used by proximity module 24 to determine whether users 2A and 2B are within a physical presence 38 of one another. Further techniques for using the confidence values are described with reference to FIG. 2.

The previous example illustrated the use of indications associated with modalities that were received by proximity module 24 from computing devices 4A and 4B. Proximity module 24 may also use indications from other modalities. Other such modalities may include a calendar service, social network service, and/or network accessible documents. Network accessible documents may include, for example, any file accessible on a network such as the Internet. Example network accessible documents may include HTML files, word processing files, spreadsheets, media files, etc. For example, proximity module 24 may query one or more calendar services. User 2A and user 2B may use calendar services that enable the users to schedule events at various dates and times. Proximity module 24, in some examples, may query the calendaring services to determine calendar events for users 2A and 2B. For instance, proximity module 24 may initially determine a current date and time associated with computing devices 4A and 4B. Using the date and time, proximity module 24 may determine calendar events for user 2A and 2B in the calendar services. Each calendar event may include event information (e.g., indications) such as, a date, start and end time, location, event description, participants etc. In one example, proximity module 24 may compare event information for calendar events of users 2A and 2B that occur at the current date and time to determine similarities between the event information.

Based on a degree of similarity between information associated with the calendar events, proximity module 24 may determine a confidence value (e.g., a probability) for the calendar modality based at least in part on the event information of user 2A and 2B. For instance, if proximity module 24 determines a high degree of similarity between the locations, start/end times, and start/end dates, proximity module 24 may generate a confidence value that indicates a high likelihood that users 2A and 2B associated with computing device 4A and 4B are within a physical presence of one another.

As another modality, proximity module 24 may use social networking data 38 (e.g., indications). Social networking data 38 may include data used in a social networking service. As shown in FIG. 1, social networking module 32 may provide a social networking service in which users 2 each generate corresponding user accounts. Social networking data 38 may include data that indicates relationships between users 2 in the social networking service. Social networking data 38 may also include user profile information associated with users 2, event information associated with events, content (e.g., text, videos, photographs, etc.) or any other data used by a social networking service. In one example, user 2A may provide a status update in the social networking service that indicates a location and time of user 2A. Similarly, user 2B may also provide a status update that includes information about a time and location of user 2B. Proximity module 24 may compare the status update information and determine a confidence value that indicates whether user 2A and 2B associated with computing device 4A and 4B are within a physical presence of one another based on the similarities between the location and time information. Although described using status updates, date, time, and location information, any suitable social networking data 38 may be used by proximity module 24. Still other example modalities may include network addresses (e.g., Internet protocol addresses) of computing devices 4 and check-in services that indicate locations where users 2 have checked in. Such modalities may similarly be used by proximity module 24 to determine whether users 2A and 2B of computing devices 4A and 4B are within a physical presence of one another.

In some examples, proximity module 24 may compare the confidence value to a boundary value to determine whether users associated with computing devices are within a physical presence of one another. A boundary value may be any value by a user or automatically generated by a computing device. In some examples, if the confidence value is greater than a boundary value, server device 22 may perform one or more operations to indicate that users associated with computing devices are within a physical presence of one another. Although illustrated as a comparison of a confidence value that is greater than a boundary value, any suitable comparison may be performed between a confidence value and a boundary value to determine whether users associated with computing devices are within a physical presence of one another.

Upon determining that users 2A and 2B associated with computing devices 4A and 4B are within a physical presence of one another, server device 22 may perform one or more operations to indicate that the users are within the physical presence of one another. For instance, event module 26 may send one or more messages that include information for display to computing devices 4A and 4B that indicate users 2A and 2B associated with computing devices are within a physical presence of one another. The information may identify computing device 4B and/or user 2B. For example, the information may include data from user 2B's social network profile, such as a name, photo, email address, username, etc. In one example, communication module 6A upon receiving such a message may cause output device 10A to display at least some of the information in graphical user interface (GUI) 16. As shown in FIG. 1, GUI 16 may display information 20A indicates user 2B is within a physical presence of user 2A. In some examples, GUI may further include user interface objects 18A. User interface objects 18A may be control buttons, although any suitable user interface components may be used.

User interface objects 18A may be selectable by user 2A via input device 8A and/or output device 10A. For instance, user 2A may provide a user input to confirm whether user 2B is within a physical presence of user 2A by selecting the "Y" (e.g., yes) user interface component of user interface components 18A. Upon determining user 2A has provided a user input, communication module 6A may send a message to server device 22 to indicate the selection. Upon receiving the message, logging module 28 may store log data 36 to indicate that user 2A and user 2B are within a physical presence of one another. Logging module 28 and log data 36 are further described in the example of FIG. 4. In some examples, server device 22 may generate a mailing list, social group in a social networking service, or follow-up event in response to determining users associated with computing devices are within a physical presence of one another.

In another example, event module 26 may perform an operation to indicate computing devices 4A and 4B that includes determining a current time associated with computing device 4A, computing device 4B, and/or server device 22. The current time may be a date and time associated with one of the devices when proximity module 24 determines whether computing devices 4A and 4B are in proximity to one another. In another example, the current time may be a date and time associated with indications received by server device 22 from computing devices 4A and 4B. For instance, a temporal identifier in an indication sent by computing device 4 to proximity module 24 may include a current date and time.

In any case, upon determining the current time, event module 26 may determine at least one event based at least in part on the temporal identifier. For instance, event module 26 may query event data 34 using the temporal identifier to determine one or more events. Event data 34 may be stored in one or more event data sources, which may include databases, caches, documents, or any other suitable data storage structure. Examples of event data 34 may include event data in a calendaring system, information stored on Internet pages, or any other source of event information. Further examples of event data 34 may include, document, calendar system, web page, email, instant message, and text message. Event module 26 may also query social networking data 38 to determine the event. An event, generally, may be any gathering, happening, or other observable occurrence. Examples of events may include a meeting, party, concert, wedding, gathering, occurrence that includes zero or more people, etc. Event module 26 may query event data 34 and social networking data 38 using the temporal identifier to identify events that overlap with or occur within specified time duration of the date and/or time specified by the temporal identifier. For instance, calendar events included in calendars of calendaring services for users 2A and 2B may indicate start time, end time, location, event description and other suitable event information.

Event module 26 may determine that a start time of an event for user 2A's calendar overlaps with an end time for user 2B's calendar. Consequently, because event module 26 has determined that users 2A and 2B associated with computing devices 4A and 4B are within a physical presence 38 of one another and that calendar events associated with calendars of user 2A and 2B overlap, event module 26 may send a message to computing devices 4A and 4B that includes information for display at the computing devices to indicate the event. For instance, if the calendar event associated with user 2A indicated "Jake's Wedding" and the calendar event associated with user 2B indicated "Chelsea's Wedding," event module 26 may send a message to computing device 4A that displays information 20B, e.g., "You appear to be at Chelsea's Wedding." User 2A may select a user interface object "Y" (e.g., Yes) of user interface objects 18B to indicate user 2A is attending Chelsea and Jake's wedding. Communication module 6A may send a message to server device 22 to indicate the selection. In some examples, event module 26, upon receiving the message may associate user 2A with an event in event data 34 that represents Chelsea and Jake's wedding. The message, in some examples, may include one or more characteristics that describe the event. For instance, characteristics may include an event name, event time/date, event participants, event media (e.g., photos, videos, audio, etc.), or any other descriptive information about the event. Logging module 28, in response to receiving the message, may also store data that indicates user 2A is attending Chelsea and Jake's wedding. Logging module 38 may, in some examples, store data in logging data 36 that indicates user 2A was within a physical presence 38 of user 2B.

In some examples, event module 26, may determine an event based at least in part on a temporal identifier that includes a current date and time and further based at least in part on geopositions associated with indications received from computing devices 4A and 4B. For instance, event module 26 may determine an event by querying event data 34 using geopositions of computing devices 4A and 4B and temporal identifier. Event module 26 may determine one or more events are indicated in event data 34 that are associated with or near geopositions of computing devices 4A and 4B, and further overlap in time with the temporal identifier. In some examples, event module 26 may use geoposition coordinates to identify a geographic area rather than a precise location to provide greater flexibility in identifying events that match the geopositions of computing devices 4A and 4B.

When event module 26 has determined one or more events based at least in part on one of the geoposition data and/or temporal identifier, event module 26 may send one or more messages to computing devices 4A and 4B that include information for display at the computing devices. The message may include information that indicate the events determined by event module 26 based at least in part on geoposition data and/or temporal identifier. Communication module 6A may cause output device 10A to display user interface objects that user 2A may select to indicate whether user 2A is attending the events. Upon determining user 2A has provided a user input to select one or more of the user interface objects, communication module 6A may send one or more messages to server device 22. Event module 26 may store data in event data 34 to indicate user 2A is associated with the one or more selected events indicated by the messages. Logging module 36 may store data in logging data 36 to similarly indicate that user 2A has attended the event.

In some examples, event module 26 may determine spontaneously, e.g., on an ad hoc basis whether an event is occurring based on whether users associated with computing devices are within a physical presence of one another. For instance, event module 26, upon determining users 2A and 2B are within a physical presence of one another, may further determine whether an event is indicated in event data 34 and/or social data 38 based at least in part on one of a temporal identifier or geoposition. If event module 26 does not determine an event, event module 26 may determine whether to generate data in event data 34 that indicates an event based on one or more event criteria (e.g., event module 26 may determine the event and generate the event data on an ad hoc basis). For instance, a criterion may be based on a distance between computing devices, a frequency with which users associated with computing devices are within a physical presence of one another at an indicated time, a density of computing devices within a predetermined area, whether a relationship exists in a social networking service between users, or any other suitable criteria to determine an event has occurred.

In one example of determining a criterion, users 2A and 2B may meet in the same geographic location according to regular interval (e.g., a regular meeting at a particular time and day). Event module 26 may include a criterion that an event is determined to exist when two users are within a geographic area at a regular interval. Consequently, event module 26 may determine the criterion is satisfied and generate data in event data 34 that indicates the event. Event module 26 may send messages to computing devices 4A and 4B to indicate the event. Such message may be used to enable users 2A and 2B to confirm the existence of the event. Event module 26 may subsequently receive messages based on input from users 4A and 4B from computing devices 4A and 4B which may be used to confirm the event in event data 43. Event module 26 may for example associate users 2A and 2B with event data in event data 34. Although a single criterion has been described, any number of criteria may be used in combination or separately to determine when an event may be generated in response to determining that users 2A and 2B associated with computing devices 4A and 4B are within a physical presence of one another.

In some examples, techniques of the present disclosure may improve the accuracy of determining whether an event is occurring spontaneously and on an ad hoc basis using negative information. Negative information, generally, may be data usable to determine that event is not occurring or does not exist. In this way, routine occurrences or occurrences that are not of suitable significance may not be determined by event module 26 to be events. For instance, negative information may indicate that user 2A is at single location for an extended period of time (e.g., his or her workspace) that within a predetermined distance of user 2B who is also at a single location for an extended period of time. Consequently, proximity module 24 may determine that user 2A and 2B are not attending a spontaneous event because the location of user 2A and user 2B (and corresponding devices 4A and 4B) routinely in this same physical area for the same time. Thus, proximity module 24, in some examples, may use indications associated with various modalities to determine events are not occurring. In another example, users 2A and 2B may be attending an event together (e.g., having coffee at a coffee shop). User 2C may be within a predetermined distance from user 2A and 2B at the event; however, proximity module 24 may determine that user 2C does not have relationships with users 2A and 2B in a social networking service. Consequently, proximity module 24 may determine that user 2C is not attending the event of users 2A and 2B. Thus, proximity module 24 may not send a message, for example, to indicate the event of user 2A and 2B. While the previous examples provide two illustrations of using negative information to determine a user is not associated with an event, negative information may be used in any variety of ways to improve the accuracy of determining whether an event is occurring and which users are associated with such an event.

Figure 5:
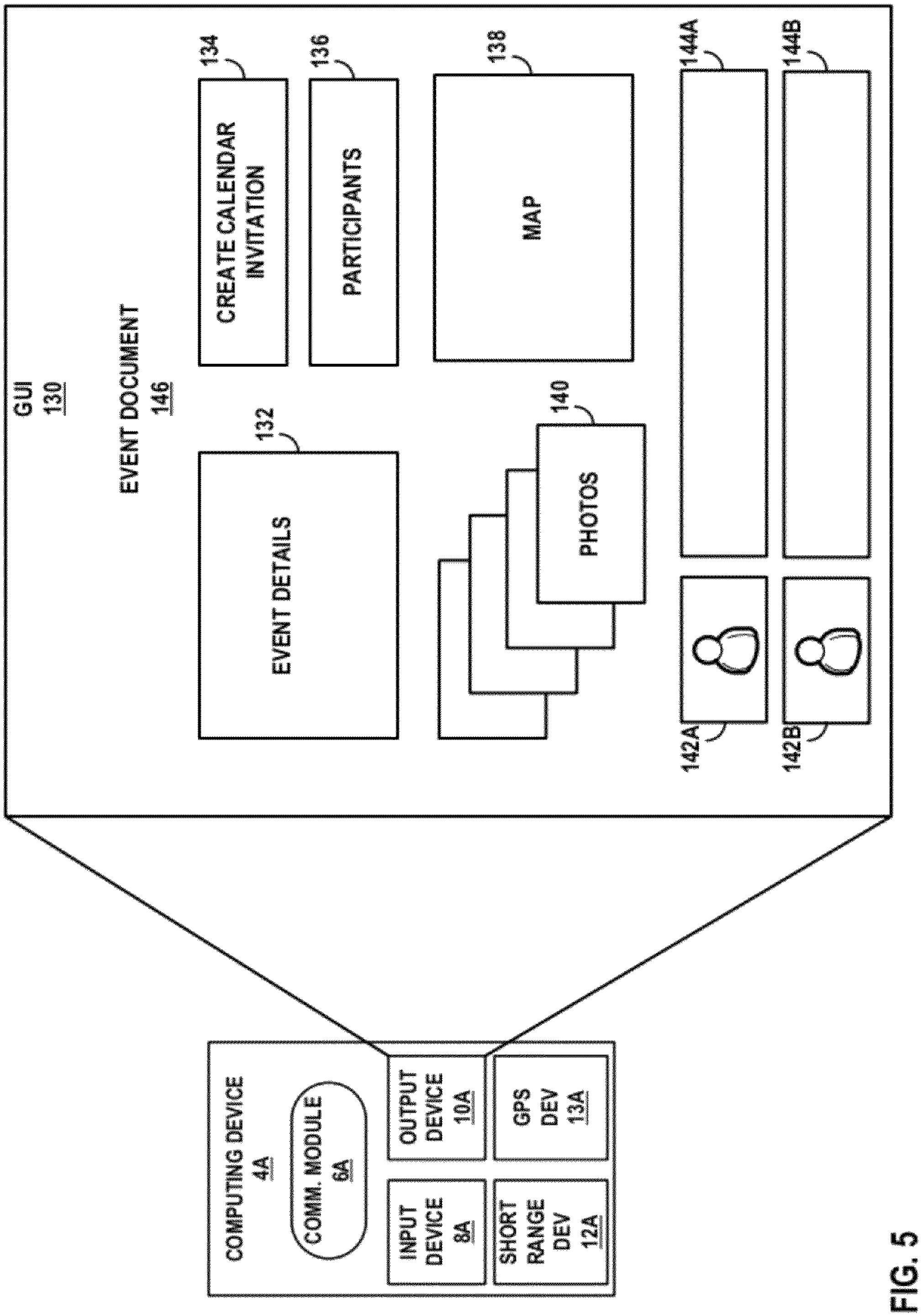
FIG. 5 is an example of a computing device displaying a graphical user interface, in accordance with one or more aspects of the present disclosure.

As another example of performing an operation to indicate that computing devices 4A and 4B are within a physical presence of one another, event module 26 may generate an event page associated with an event as further described in FIG. 5. In some examples, proximity module 24, upon determining that users 2A and 2B of computing devices 4A and 4B are within a physical presence of one another, may send messages the computing devices that enable users 2A and 2B to engage in a group chat.

In still another example of performing an operation to indicate that computing devices 4A and 4B are within a physical presence of one another, social networking module 32, in response to determining an event, may generate a social group in a social networking service that is associated with the event. A social group may be a group of one or more users in a social networking service that are associated with an event. In some examples, content associated with the event (e.g., content shared on an event page) may be created, accessed by, and/or modified by users included in the social group. In such examples, social networking module 32 may, in response to determining the event, send a request to computing device 4A to associate user 2A with a social group corresponding to the event. Communication module 6A may cause output device 10A to display a prompt to user 2A that enables user 2A to associate with or not associate with the social group. Upon receiving a selection from the user, communication module 6A may send a message to social networking module 32 to associate or not associate user 2A with the social group in the social networking service.

In some examples, techniques of the present disclose may enable users to transitively establish relationships in a social network when computing devices of the users are within a predetermined distance of one another. In other examples, techniques of the present disclosure may enable a third user to receive a notification of an event from a first user when each of the first and third users a relationship with a second user in a social networking service. For example, as shown in FIG. 1, upon receiving indications from computing devices 4A-4B, proximity module 24 may determine that computing device 4C is within a predetermined distance from computing device 4B. Upon determining computing devices 4B and 4B are within the predetermined distance, social networking module 32 may determine whether relationships exist between user 2C and one or both of users 2A and/or 2B. If social networking module 32 determines that a relationship exists between user 2C and one or both of users 2A and 2B, event module 26 may further determine whether users 2A and 2B are participating in an event. For instance, event module 26 may determine that computing devices 4A and 4B are within a predetermined distance and further the location of computing device 4A or 4B is within an area that includes an event. If such an event exists, event module 26 may send a message to computing device 4C that indicates the event. In this way, computing device 4C may receive an indication of an event attended by users 2A and 2B when user 2C is within a predetermined distance from one or both of users 2A and 2B.

The aforementioned techniques may be implemented by server device 22 to enable user 2C to transitively establish relationships in a social networking service with other users and suggest possible relationships to other users. For instance, if computing devices 4A and 4B are within predetermined distance 38 of each other, social networking module 32 may determine if user 2A has a relationship with user 2C in a social networking service. If so, event module 26 may send a message to computing device 4C that indicates user information of user 2B. Thus, when a relationship exists between user 2A and 2C, server device 22 may send a message to computing device 4B to indicate a potential relationship between user 2B and user 2C. Consequently, user 2C may add user 2B to user 2C's social network. In some examples, user 2C may receive a request to confirm that user 2B and user 2C are or have attended an event together or were within a predetermined distance. In this way, techniques of the disclosure may query social networks of a user 2A who is within a predetermined distance of user 2B and notify user 2C of user 2B because user 2A and user 2C have a relationship in a social networking service. In some examples, computing device 4C may receive a notification that enables user 2C to establish a relationship with user 2B in the social networking service. A predetermined distance may be any value indicating a distance that is input by a user or generated by a computing device.

Techniques of the present disclosure may be performed as computing devices send indications to server device 22, as previously described in FIG. 1. In such examples, server device 22 may process current indications to perform techniques of the present disclosure as new indications are received (e.g., as computing devices 4A and 4B enter into a predetermined distance). In other examples, techniques of the present disclosure may determine, at a later time that users associated with computing devices were within a physical presence of one another at a previous time. For instance, techniques of the disclosure may evaluate one or more indications any time after the indications are received to determine, e.g., whether two computing devices are within a predetermined distance of one another or users are participating in an event.

Figure 2:
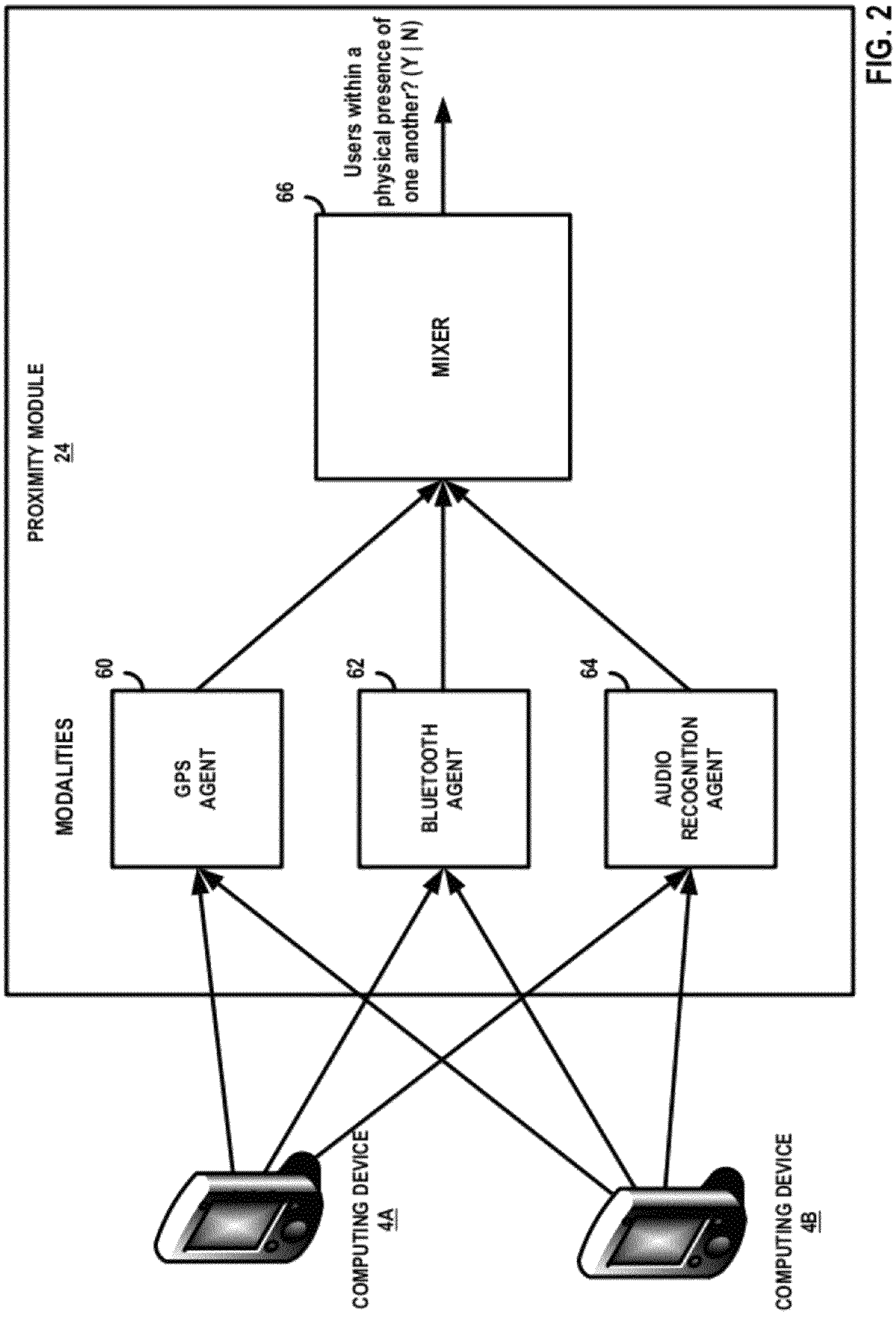
FIG. 2 is a conceptual diagram of example techniques to determine whether users associated with computing devices are within a physical presence of one another, in accordance with one or more aspects of the present disclosure.

FIG. 2 is a conceptual diagram of techniques to determine whether users associated with computing devices are within a physical presence of one another, in accordance with techniques of the present disclosure. As shown in FIG. 2, computing devices 4A and 4B may send indications associated with modalities to a server device that includes proximity module 24 as described in FIG. 1. As shown in FIG. 2, proximity module 24 may make a single decision (e.g., computing devices in proximity, yes or no) given information from diverse modalities. In the example of FIG. 2, each modality is represented by an agent component. For instance, GPS agent 60, Bluetooth agent 62, and audio recognition agent 64 may receive, respectively: geoposition indications, short-range wireless communication indications, and audio indications from computing devices 4A and 4B. As will be further describe with respect to FIG. 2, mixer 66 may use confidence values from the agents to determine whether users associated with computing devices are within a physical presence of one another. Because different modalities will fail under different circumstances, mixer 66 may make well informed decisions by providing greater weight to agents with low margin of error and high quality sources (e.g., more trustworthy agents) and lesser weight to less trustworthy sources.

As shown in FIG. 2, mixer 66, implementing techniques of the disclosure may determine whether computing devices 4A and 4B are in proximity to one another, e.g., whether users associated with computing devices 4A and 4B are within a physical presence of one another. Each of computing devices 4A and 4B may have access to a GPS and the Bluetooth stack. In some examples, each of these modalities may independently be sufficient for mixer 66 to make a determination as to whether users 2A and 2B associated with computing devices 4A and 4B are within a physical presence of one another. In other circumstances, mixer 66 may use multiple modalities to make the determination. To provide more precise determinations about the proximity of computing devices 4A and 4B to one another, agents may determine confidences in indications received from the computing devices in different circumstances. Agents 60-64 may derive a measure of confidence from the indications themselves. For instance, GPS indications may provide explicit uncertainty bounds (e.g., margin of error) along with a geoposition. Bluetooth scans provide an implicit measure of uncertainty in that a short-range wireless communication via Bluetooth may detect many or few other computing devices.

As one example, computing devices 4A and 4B may be at a high altitude with few obstructions, e.g., at the top of a mountain. The computing devices will get good signals from many satellites and the position uncertainty may be very low. In such examples, mixer 68 may determine whether users 2A and 2B associated with computing devices 4A and 4B are within a physical presence of one another based solely on GPS. In the current example, there may be few other Bluetooth sources: possibly only one other computing device on another mountaintop nearby. Seeing the Bluetooth signal of this other computing device may or may not be a useful indication of proximity since very low radio frequency noise will be present and the signal may therefore be detectable over a long distance. In this case mixer 66 may weigh the GPS indications much higher than Bluetooth indications sent by computing devices 4A and 4B to proximity module 24.

In another example, computing devices 4A and 4B may be an office building in Manhattan leading to different environment than the mountaintop of the previous example. In the current example, computing devices 4A and 4B may get receive a GPS signal at all, or only a few satellites may be visible. Computing devices 4A and 4B may determine the geopositions received from the satellites are characterized by a large margin of error with the location it returns. Even if a high margin of error is not detected, computing devices 4A and 4B may use data based on previous experiences. The data may indicate that signal reflections are more likely in a dense metropolitan area and therefore geopositions are characterized by higher margins of error. The office building may, however, be embedded in a rich radio frequency environment with many Bluetooth sources (e.g., included in other computing devices). The larger number of Bluetooth sources may therefore provide a higher confidence using Bluetooth indications to determine whether users 2A and 2B are within a physical presence of one another.

In some examples, mixer 66 may determine a probability of being in a particular class as p(ω|x), wherein ω can take either the value "within physical presence" or its complement "not within a physical presence." The value x may be the entirety of the input available mixer 24, for example, confidence values from GPS agent 60, Bluetooth agent 62, audio recognition agent 64 or any other agent associated with a modality that may be used to determine whether users associated with computing devices are within a physical presence of one another.

Given the set of agents M (60-64, etc.) as shown in FIG. 2 (which may be referred to as experts in some example techniques), mixer 66 may interrogate any individual agent m to learn what likelihood the agent assigns to the two users being within a physical presence of one another p(ω|x,m). In some examples, the individual agents may have access to the entirety of indications received from computing devices 4A and 4B. Agents 60-, in general, may access data in the indications across modalities. In one example, if many indications are received in a vector from, for example, computing device 4A, agents 60-64 may ignore one or more indications in the vector. For instance, GPS agent 60 may ignore all indications available to it except for the GPS indications and return a confidence value (e.g., probability) indicating whether users associated with computing devices are within a physical presence of one another by integrating over the area of uncertainty (e.g., margins of error) associated with the GPS indications.

The framework implemented by mixer 66 weights each agent 60-64 with a term supplied by a critic p(m|x), which indicates a probability that the agent corresponding to the critic is the correct agent to trust given a particular indication. In some examples, the critics may be associated with mixer 66 and/or a corresponding agent. The critics, like the agents, may have access to all of the indications from computing devices 4A and 4B but may choose not to use one or more of the available indications. If the critic anticipates that an agent is likely to return a spurious result then the critic may give very little weight to the confidence value generated by the agent, allowing other agents to drive the decision. For instance, GPS agent 60 may place a high probability of users 2A and 2B being within a physical presence of one another if both computing devices associated with users 2A and 2B, respectively, report the same location but with a large error, say ±100 meters. The critic would then notice the large error and discount the likelihood that the agent is generating useful data. Consequently, when mixer 66 determines whether users associated with computing devices are within a physical presence of one another based on confidence values received from agents 60-64, confidence value associated with GPS agent 60 may receive less weight than confidence values from other agents.

The framework used by mixer 66 may also use an experience term. As one example, an experience term may discount a confidence value from GPS agent 60 if the reported location happens to be from an area where a high level of unexpected radio frequency noise has been observed in the past. For instance, GPS indications generated while in downtown Manhattan may be based on satellite signals that are reflected off tall buildings, leading GPS agent to determine less precise confidence values that even the critic cannot anticipate. Consequently, the confidence value may be weighted less by the experience term. An advantage of this framework is that it allows appropriate agents to provide greater include in decisions made by mixer 66 based on the experience term.

The framework implemented in mixer 66 may accommodate any number of modalities. In some examples, a modality may include a Passive Radio Frequency Spectrum. For instance, numerous techniques exist for turning a list of IEEE 802.11 signal strengths into a fingerprint suitable for proximity determination. Some may also be applied to Bluetooth signals. Such techniques could be used by the framework implemented in mixer 66. If some techniques work well in one situation and not another then a critic and experience terms can prevent them from polluting the decision. A partial list of Wifi fingerprinting algorithms include: sum of differences of normalized signals, cosine similarity, and Spearman ranking. Such techniques may be implemented by an agent when receiving indications associated with a passive radio frequency spectrum.

As another example, a modality may include an Active Radio Frequency Spectrum. For instance, Bluetooth allows each handset to become a broadcaster as well as a listener. Bluetooth agent 62 may use the fact that computing device 4A detection of computing device 4B's device identifier as a measure of whether users 2A and 2B are within a physical presence of one another.

As described above in reference to FIG. 1, some location services, including GPS, provide both a location (e.g., geoposition) and an error bound (e.g., margin of error). That error bound may be taken as a parameter defining some distribution over location of the actual position of a computing device.

That distribution might be uniform, or normal, or some other family. Computing the difference between these random variables yields a new distribution. Integrating over this distribution, bounded to the distances deemed to be "in close proximity" will yield the probability that users 2A and 2B associated with computing devices 4A and 4B are within a physical presence of one another.

Figure 3:
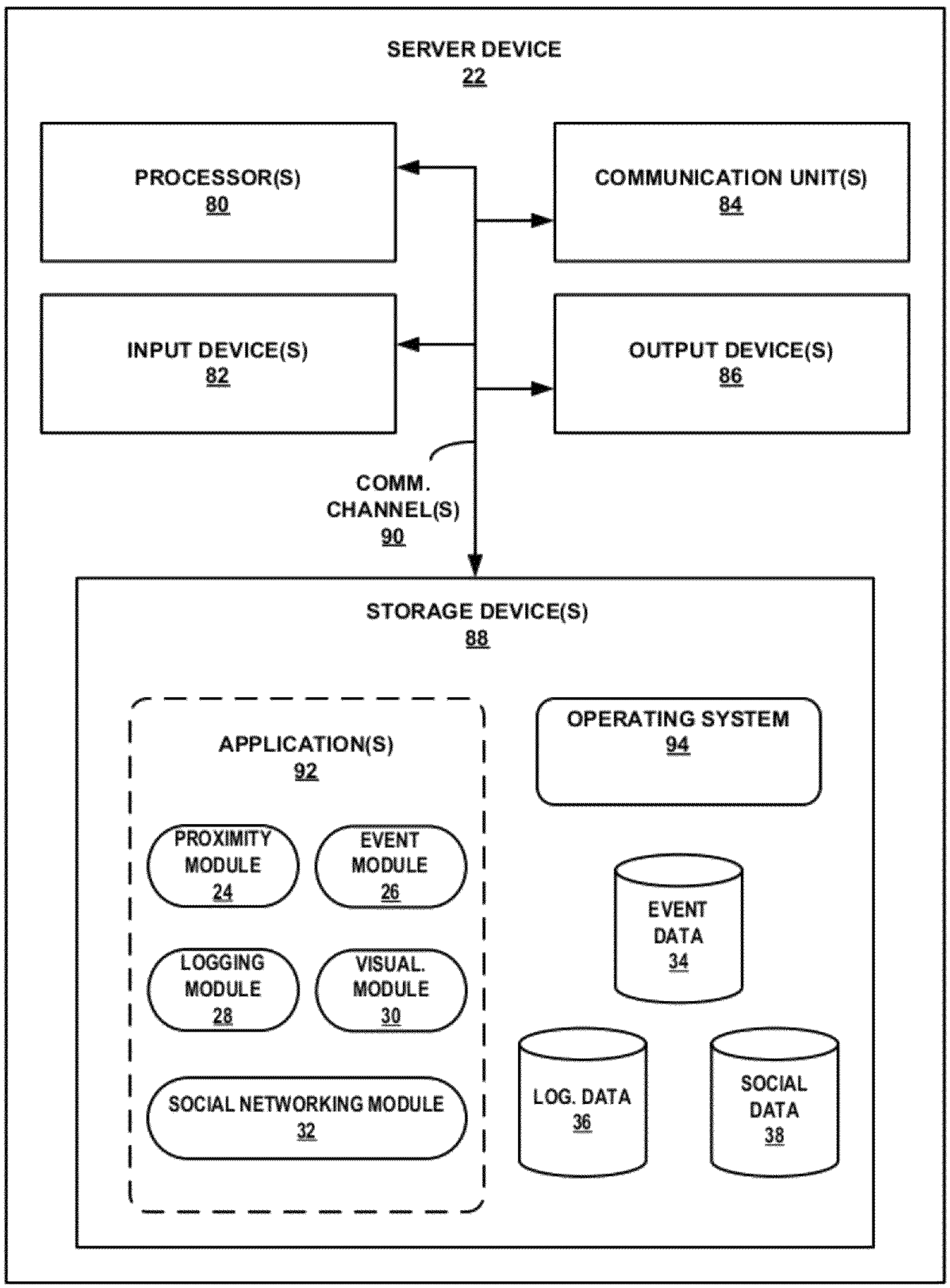
FIG. 3 is a block diagram illustrating further details of one example of a server device shown in FIG. 1, in accordance with one or more aspects of the present disclosure.

FIG. 3 is a block diagram illustrating further details of one example of a server device shown in FIG. 1, in accordance with one or more aspects of the present disclosure. FIG. 3 illustrates only one particular example of server device 22, and many other examples of server device 22 may be used in other instances.

As shown in the specific example of FIG. 3, server device 22 includes one or more processors 80, a communication unit 84, one or more storage devices 88, input device 82, and output device 86. Server device 22, in one example, further includes applications 92 and operating system 94 that are executable by server device 22. Each of components 80, 82, 84, 86, and 88 may be interconnected (physically, communicatively, and/or operatively) for inter-component communications. In some examples, communication channels 90 may include a system bus, network connection, interprocess communication data structure, or any other channel for communicating data. As one example in FIG. 3, components 80, 82, 84, 86, and 88 may be coupled by one or more communication channels 90. Applications 92 (includes modules 24, 26, 28, 30, and 32) and operating system 94 may also communicate information with one another as well as with other components in server device 22.

Processors 80, in one example, are configured to implement functionality and/or process instructions for execution within server device 22. For example, processors 80 may be capable of processing instructions stored in storage device 88.

One or more storage devices 88 may be configured to store information within server device 22 during operation. Storage device 88, in some examples, is described as a computer-readable storage medium. In some examples, storage device 88 is a temporary memory, meaning that a primary purpose of storage device 88 is not long-term storage. Storage device 88, in some examples, is described as a volatile memory, meaning that storage device 46 does not maintain stored contents when the computer is turned off. Examples of volatile memories include random access memories (RAM), dynamic random access memories (DRAM), static random access memories (SRAM), and other forms of volatile memories known in the art. In some examples, storage device 88 is used to store program instructions for execution by processors 80. Storage device 88, in one example, is used by software or applications running on server device 22 (e.g., applications 88) to temporarily store information during program execution.

Storage devices 88, in some examples, also include one or more computer-readable storage media. Storage devices 88 may be configured to store larger amounts of information than volatile memory. Storage devices 88 may further be configured for long-term storage of information. In some examples, storage devices 88 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Server device 22, in some examples, also includes one or more communication units 84. Server device 22, in one example, utilizes communication unit 84 to communicate with external devices via one or more networks, such as one or more wireless networks. Communication unit 84 may be a network interface card, such as an Ethernet card, an optical transceiver, a radio frequency transceiver, or any other type of device that can send and receive information. Other examples of such network interfaces may include Bluetooth, 3G and WiFi radios computing devices as well as USB. In some examples, server device 22 utilizes communication unit 84 to wirelessly communicate with an external device such as computing devices 4 of FIG. 1, or any other computing device.

Server device 22, in one example, also includes one or more input devices 82. Input device 82, in some examples, is configured to receive input from a user through tactile, audio, or video feedback. Examples of input device 82 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices 86 may also be included in server device 22. Output device 86, in some examples, is configured to provide output to a user using tactile, audio, or video stimuli. Output device 86, in one example, includes a presence-sensitive screen, a sound card, a video graphics adapter card, or any other type of device for converting a signal into an appropriate form understandable to humans or machines. Additional examples of output device 86 include a speaker, a cathode ray tube (CRT) monitor, a liquid crystal display (LCD), or any other type of device that can generate intelligible output to a user.

Server device 22 may include operating system 94. Operating system 94, in some examples, controls the operation of components of server device 22. For example, operating system 54, in one example, facilitates the interaction of applications 92 with processors 80, communication unit 84, storage device 88, input device 82, and output device 86. As shown in FIG. 3, applications 92 may include proximity module 24, event module 26, logging module 28, visual module 30 and social networking module 32 as described in FIG. 1. Applications 92 may each include program instructions and/or data that are executable by server device 22. As one example, proximity module 24 may include instructions that cause server device 22 to perform one or more of the operations and actions described in the present disclosure.

In accordance with aspects of the present disclosure, communication unit 84 may receive a first group of indications associated with a first group of modalities of computing device 4A and a second group of indications associated with a second group of modalities of computing device 4B. Proximity module 24 may use indications of the first and second groups of modalities to determine whether users 2A and 2B associated with computing devices 4A and 4B are within a physical presence of one another.

As shown in FIG. 3, proximity module 24 may determine a confidence value for at least one modality of the first or second groups of modalities based at least in part on an indication associated with the at least one modality. The confidence value determined by proximity module 24 may indicate a likelihood that a first user and a second user associated with first and second computing devices, respectively, are within a physical presence of one another. The one or more indications used to generate the confidence value may be included in at least the first or second group of indications. Proximity module 24 may determine that users 2A and 2B associated with computing devices 4A and 4B are within a physical presence of one another based at least in part on the confidence value for the at least one modality. Upon determining that the confidence value is greater than a boundary value, performing, one or more of proximity module 24, event module 26, logging module 28 and/or visualization module 30 may perform one or more operations to indicate that users 2A and 2B associated with computing devices 4A and 4B are within a physical presence of one another.

In some example operations, proximity module 24 may send one or more messages to computing devices 4A and/or 4B that indicate that users 2A and 2B are within a physical presence of one another. In another example, event module 26 may determine an event associated with a location or area that includes at least one of computing devices 4A or 4B. Event module 26 may send one or more messages to computing devices 4A and/or 4B that indicate the event and enable users to share content about the event. In another example operation, logging module 28 may generate log data that indicates users 2A and 2B are within a physical presence of one another. Logging module 28 may, in another example, log data that indicates that users 2A and 2B are within a physical presence of one another. In still other example operations, visualization module 30 may format, arrange and/or perform other operations to modify the appearance of information sent by server device 22 to computing devices 4A and/or 4B.

In some examples, techniques of the present disclosure provide privacy and/or security functionality for any data collected or processed by server 22. For instance, users may opt out of some or all functionality described in the present disclosure. In this way, users can choose whether techniques of the present disclosure are applied to data received from one or more devices. In some examples, techniques of the present disclosure provide symmetric and/or asymmetric control over user data. For instance, in one example, users 2A and 2B may provide selections to server device 22 indicating they wish to receive messages indicating when other users and computing devices are within a physical presence of them. Users 2A and 2B may also provide selections to server device 22 indicating that they wish to enable server device 22 to determine whether they are in the physical presence of one or more other users and/or computing devices and share such information with other computing devices. Such controls may similarly be applied to logging by logging module 28 such that all, some or no data about a user is logged according to user preferences specified by a user. Users may further control whether to be associated with events determined by server device 22.

In some examples, techniques of the disclosure enable a user to set preferences to share only a limited amount of information associated with a user in a social networking service with other users. For instance, if proximity module 24 determines that users 2A and 2B are within a physical presence of one another, user preferences may specify that computing device 4B only receive a subset of social networking data associated with user 2A in a social networking service. In this way, users may control how their information is shared with other users.

Techniques of the present disclosure may also enable users to control access to content shared using event documents, social groups, group chats or any other components associated with users that are within a physical presence of one another. For example, users may provide preferences that specify which other users can view content on an event document. Users may further delete or modify content associated with such documents. In other examples, user may provide preferences to control which users have access to participating in a group chat created in response to server device 22 determining that users associated with computing devices are within a physical presence of one another. Generally, techniques of the disclosure enable a user to provide any number of preferences to control access of any information associated with a user.

Figure 4:
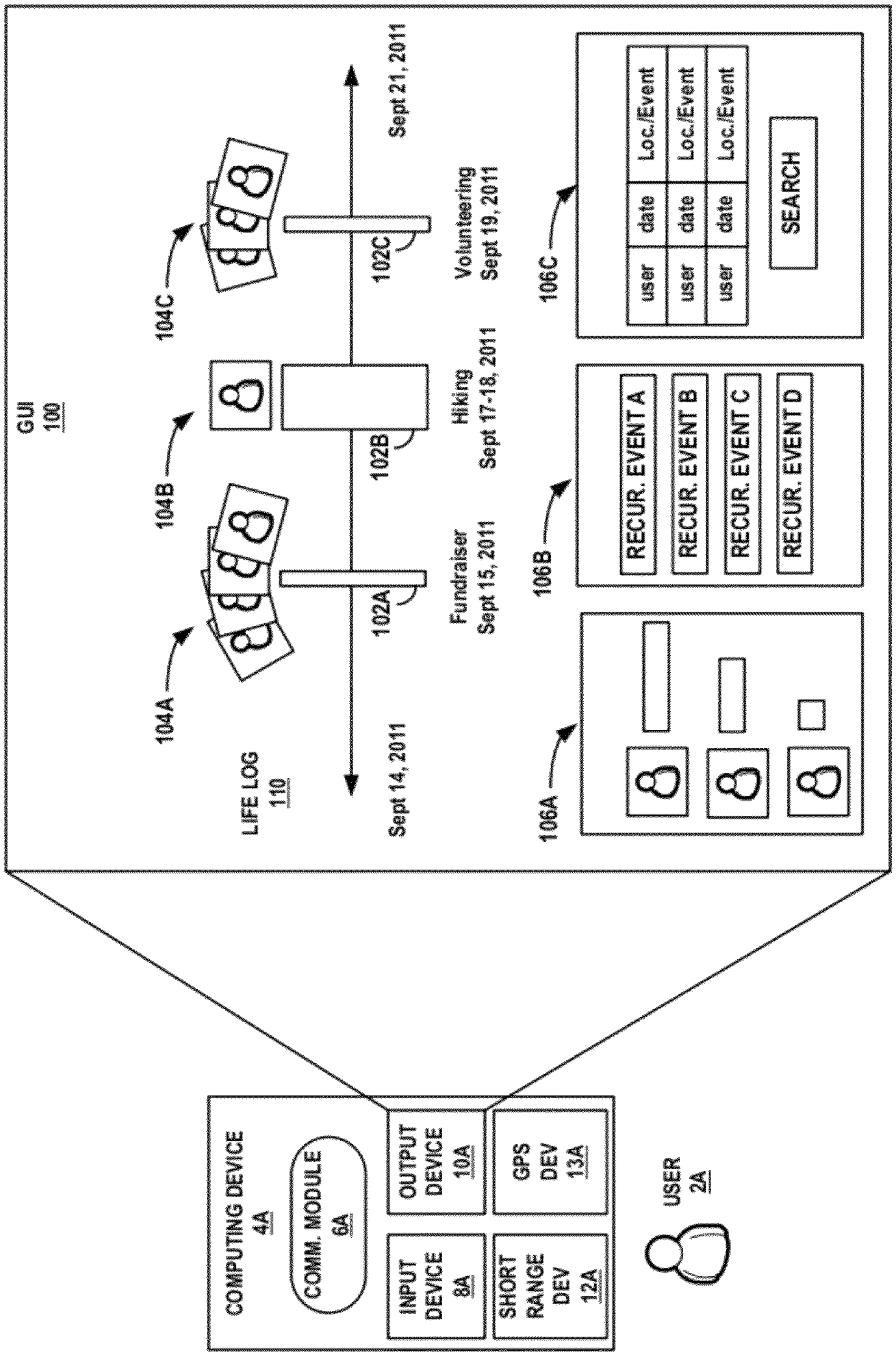
FIG. 4 is an example of a computing device displaying a graphical user interface, in accordance with one or more aspects of the present disclosure.

FIG. 4 is an example of a computing device that is operable to display a graphical user interface, in accordance with one or more techniques of the present disclosure. As described in reference to FIG. 1, logging module 28 may log one or more events as data in logging data 36. In other examples, when proximity module 24 determines that users are associated with computing devices are within a physical presence of one another, logging module 28 may log data in logging data 36 that indicates, for example, users 2A and 2B were within a physical presence of one another and/or that computing devices 4A and 4B were e within a predetermined distance. Logging data 36 may indicate associations between times, dates, users, locations, events, etc. For instance, logging module 36 may determine users 2A and 2B are attending an event based at least in part on one or more confidence values generated by proximity module 24 and further on geoposition and/or other information indicating the users are attending the event. Consequently, logging module 28 may log logging data that indicates users 2A and 2B are associated with the event. In this way, techniques of the present disclosure using logging module 28 and logging data 36 enable users to later determine who they have spent their time with, what they were doing, where they were doing it, and/or what events they attended.

In some examples, user 2A may later wish to view logging data. As shown in FIG. 4, computing device 4A may include communication module 6A, input device 8A, output device 10A, short-range communication device 12A, and GPS device 13A as described in FIG. 1. User 2A may provide a user input at input device 8A that causes communication module 6A to send a message to server device 22 to request log data associated with user 2A. The message may include a user identifier that identifies user 2A. In some examples, the message may further indicate one or more parameters to specify which logging data user 2A is requesting. For instance, the message may specify the type of log data requested, the time range of the log data requested, the quantity of log data requested, or any other suitable parameter that can be used to select a set of log data. Upon receiving the message, logging module 28 may retrieve the log data based at least in part on the user identifier that identifies user 2A. Logging module 28 may, in some examples, use the parameters included in the message to further refine the retrieval of the log data. Logging module 28 may then send a message to computing device 4A for display at output device 10A.

In some examples, visualization module 30 may format the log data for proper display at computing device 4A. For instance, visualization module 30 may dynamically generate a Hypertext Transfer Protocol Language (HTML) document that includes the log data in a format presentable to user 2A. In some examples, visualization module 30 may format the log data for improved display based at least in part on the capabilities of computing device 4A (e.g., processing performance, display size and resolution, etc.).

Computing device 4A upon receiving the logging data from server 22 may display logging data in GUI 100 using output device 10A. Many various types of logging data may be included in GUI 100 by communication module 6A and presented in multiple different configurations. For instance, GUI 100 may display a life log 110 that, for a given time range, displays a list of users that were nearby user 2A. For instance, life log 110 may display event indicators 102A, 102B, and 102C for the time range of Sep. 14, 2011 through Sep. 21, 2011. In another example, life log 110 may display each user associated with a computing device that was within a physical presence of user 4A. User indicators 104A, 104B, 104C may indicate users that are associated with the event. In some examples, if user 2A provides a user input to select one of the user indicators, the selected user may be associated with user 2A, e.g., in a social networking service. In various examples, communication module 6A may modify the time range of life log 110 based at least in user input received by input device 8A. In some examples, the visual appearance of the event may be based at least in part on characteristics of the event. For instance, events longer in duration may be displayed by wider event indicators. Events corresponding to a particular group may have a common appearance such as color, pattern, shape, etc.

In some examples, logging module 28 may determine a frequency with which user 2A is within a physical presence of other users associated with remote computing devices. For instance, logging module 28 may log logging data that indicates each time user 2A is within a physical presence of another user. Logging module 28 may, automatically or in response to receiving a request from computing device 4A, determine the frequency with which user 2A is within a physical presence of other users. In one example, upon receiving such data indicating the frequencies, communication module 6A may case output device 10A to display user interface object 106A. User interface object 106A may include statistical, descriptive or any other type of information that indicates the frequencies that user 2A is within a physical presence of other users associated with various computing devices. In this way, user interface object 106A may display and rank how often and/or how long user 2A is within a physical presence of one or more other users. For instance, user interface object 106A may include a graph and a visual identifier of each user other than user 2A associated with the graph. User 2A can then identify the frequency with which user 2A is within a physical presence each of the other users.

In some examples, logging module 28 may determine patterns that indicate recurring occurrences in which users spend their time. Logging module 28 determines, for example, that users 2A and 2B regularly meet for coffee on Tuesdays at 9:00 AM. For instance, logging module 28 may periodically, continuously, or on an event-driven basis, apply one or more pattern recognition techniques to logging data. A patter recognition technique may, for example, determine that two users are within a physical presence of one another at a repeating interval in the same location. Many other suitable pattern techniques may also be implemented by logging module 28. Upon determining a pattern, logging module 28 may generate an event associated with the pattern. For instance logging module 28 may generate an event with information including "Coffee @ 9:00 AM every Tuesday with User A and User B." Logging module 23 may log the newly generated event in log data to indicate the event associated with the pattern.

Communication module 6A, in response to receiving a message with log data indicating one or more recurring events, may cause output device 10A to display indications of the one or more recurring events in user interface object 106B. In some examples, each recurring event may be represented by a selectable user interface object within user interface object 106B. Upon selecting an object associated with the event, communication module 6A may cause output device to prompt user 2A to confirm the existence of the event associated with the object. In this way, communication module 6A may display one or more events determined by server 22 and confirm whether user 2A is associated with such recurring events. In some examples, a user interface object of an event may further include characteristics of the event such as title, date, time, location, users participating in the event, etc.

In some examples, log data received by communication module 6A from server 22 may be displayed in user interface object 106C to show user 2A who they've spend their time with and where they've spent their time. As shown in FIG. 4, if user 2A was within a physical presence of another user, the date and time, and location or event may be displayed by communication module 6A. User 2A may use the information displayed in user interface object 106C to determine when and where they've spend their time with other users. In some examples, user 2A may search the log data using any number of criteria such as, date, time, location, users, etc.

FIG. 5 is an example of a computing device displaying a graphical user interface, in accordance with one or more techniques of the present disclosure. In some examples, if event module 26 determines the occurrence of an event, event module 26 may generate an event document 146 associated with the event. Event document 146 may be an HTML document or any other suitable file to associate content with an event. Content may include any visually or audibly displayable information (e.g., videos, audio recordings, text, etc.). As shown in FIG. 5, content may include event details 132, calendar invitation control 134, participant details 136, map 138, photos 140, user images 142A and 142B, and text 144A and 144B associated with user images 142A and 142B.

In an example where users 2A and 2B are attending the same event, event module 26 may send one or more messages to computing devices 4A and 4B that indicate the event document for the event. For instance, the message may include a Uniform Resource Locator (URL) that is usable by computing devices 4A and 4B to access the event document. The message may further enable communication module 6A to send messages to server 22 that associate content with the event page.

As shown in FIG. 5, computing device 4A may include communication module 6A, input device 8A, output device 10A, short-range wireless communication device 12A, and GPS device 13A as previously described in FIG. 1. In some examples, users associated with a common event may share content with each other using event document 146. For instance, event document 146 may be modified and/or managed by a social networking service provided by social networking module 32. Consequently, when users of the social networking service, e.g., user 2A, that are associated with the common event send content to server 22, social networking module 32 may associate the content with the event data representing the common event. For instance, user 2A may provide a user input that causes communication module 6A to generate an image using input device 8A (e.g., a camera). Communication module 6A may determine user 2A has provided an input to associate the image with event document 146. Consequently, communication module 6A may send a message that indicates the event document to server device 22. Communication module 6A may further send an indication of content (e.g., an image or link to the image) to server 22 to be associated with event document 146.

Social networking module 32 may receive the indication of content and associate the indication of the content with event document 146. Consequently, social networking module 32 may associate the indication of content with event document 146. In the example of FIG. 4, the image may be displayed as a photo in photos 140. As shown in FIG. 4, event document 146 may include event details 132 that describe an event. Event details may include an event name, start time, end time, location, etc. Event document 146 may further include a calendar invitation control 134. Calendar invitation control 134 may, when selected, enable a user to send calendar invitations to invite other users to the event associated with event document 146. Event document 146 may also include participant details 136. Participant details 136 may include a list of all users associated with the event. In some examples, each user may be represented by a user interface object. In response to determining a user interface object has been selected, social networking module 32 may send user provide information associated with the user of the selected object to computing device 4A for display by output device 10A.

Event document 146 may also include a map 138 that indicates a location of the event associated with event document 146. For instance, the map may include a visual marker or other indicator that indicates geographically where the event is or has occurred. Event document may also include photos 140. Photos 140 may be any images or videos send by a computing device associated with a user to server 22 to be associated with event document 146. In some examples, event document 146 may include text 144A, 144B that is provided by users via computing devices. For instance, if a user attends an event and is further associated with an event, a status update may be displayed as text 144A indicating that the user is now associated with the event. An image 142A associated with the user in a social networking service may be displayed with text 144A. In other examples, users may comment or otherwise submit information to event document 146 that is displayed, for example, as text 144B. Similarly, an image 142B associated with the user may be displayed with text 144B As shown in FIG. 5, event document 146 enables multiple users attending a common event to submit content that may be shared with other users attending the event. In some examples, all or portions of event document 146 may be generated, modified and stored at, e.g., server device 22 of FIG. 1. A computing device, e.g., a smartphone, may retrieve event document 146 from server device 22 and/or store event document 146 locally to display the contents of event document 146. Event document 146 may include one or more input components that enable a user to modify content of event document 146. The mobile computing device, upon receiving user input, may send data corresponding to the user input to, e.g., server device 22. Sever 22 may modify content associated with event document 146 based on the data. Consequently, multiple different computing devices, upon receiving the updated event document, may see updates. Event document 146 may include any combination of content shown in FIG. 5 or other content not described in FIG. 5. Moreover, in some examples, visualization module 30 may format event document 146 in any number of ways to change the layout and appearance of the document.

Figure 6:
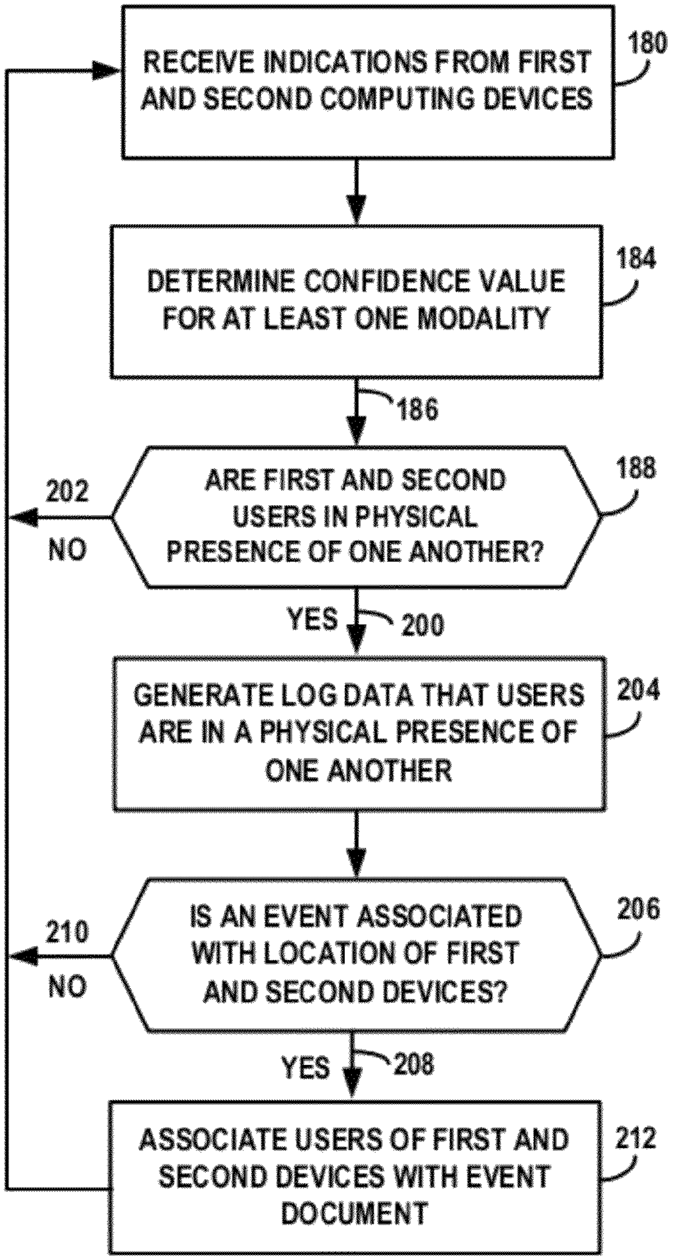
FIG. 6 is a flow diagram illustrating example operations of a computing device to determine whether users associated with computing devices are within a physical presence of one another, in accordance with one or more aspects of this disclosure.

FIG. 6 is a flow diagram illustrating example operations of a computing device to determine whether users associated with computing devices are within a physical presence of one another, in accordance with one or more aspects of this disclosure. For purposes of illustration only, the example operations are described below within the context of remote server device 22 and computing devices 4A and 4B as shown in FIG. 1.

As shown in FIG. 1, server device 22 may receive a first group of indications associated with a first group of modalities from computing device 4A (180). Server device 22 may also receive a second group of indications associated with a second group of modalities from computing device 4B (180). In some examples, the modalities may be usable to determine whether users associated with computing devices are within a physical presence of one another.

Server device 22, upon receiving the indications may determine a confidence value for at least one modality associated with the indications (184). The confidence value may indicate a likelihood that users 2A and 2B are within a physical presence of one another. As one example, server device 22 may determine a confidence value for a GPS modality. Server device 22 may generate the confidence value based on indications from computing device 4A, indications from computing device 4B or any combination thereof. In some examples, server device 22 may generate a plurality of confidence values for one or more modalities.

Server device 22 may determine whether users 2A and 2B are within a physical presence of one another (188). For instance, server device 22 may determine whether the confidence value is greater than a boundary value. If the confidence value is greater than the boundary value, server device 22 may determine that users 2A and 2B are within a physical presence of one another. If users 2A and 2B are not within a physical presence of one another, server device 22 may receive subsequent indications associated with modalities and make further determinations of whether users are associated with computing devices are within a physical presence of one another (202). If users 2A and 2B are within a physical presence of one another, logging module 28 may generate log data that indicates users 2A and 2B associated with computing devices 4A and 4B are within a physical presence of one another (204). In some examples, logging module 28 may generate log data that indicates computing devices 4A and 4B are within a predetermined distance.

In some examples, event module 26 may determine whether an event is associated with a location of computing devices 4A and 4B when users 2A and 2B are within a physical presence of one another (206). If the users 2A and 2B are within a physical presence of one another, event module 26 may associate users 2A and 2B with an event document (212). For instance, user identifiers that identify users 2A and 2B in a social networking service may be associated with the event document thereby enabling users 2A and 2B to easily share content about the event. In other examples, if an event is not associated with a location of computing devices 4A and 4B when users 2A and 2B are within a physical presence of one another, server device 22 may continue receiving indications from computing devices and determining if such computing devices are within a predetermined distance of one another (210).

Figure 7:
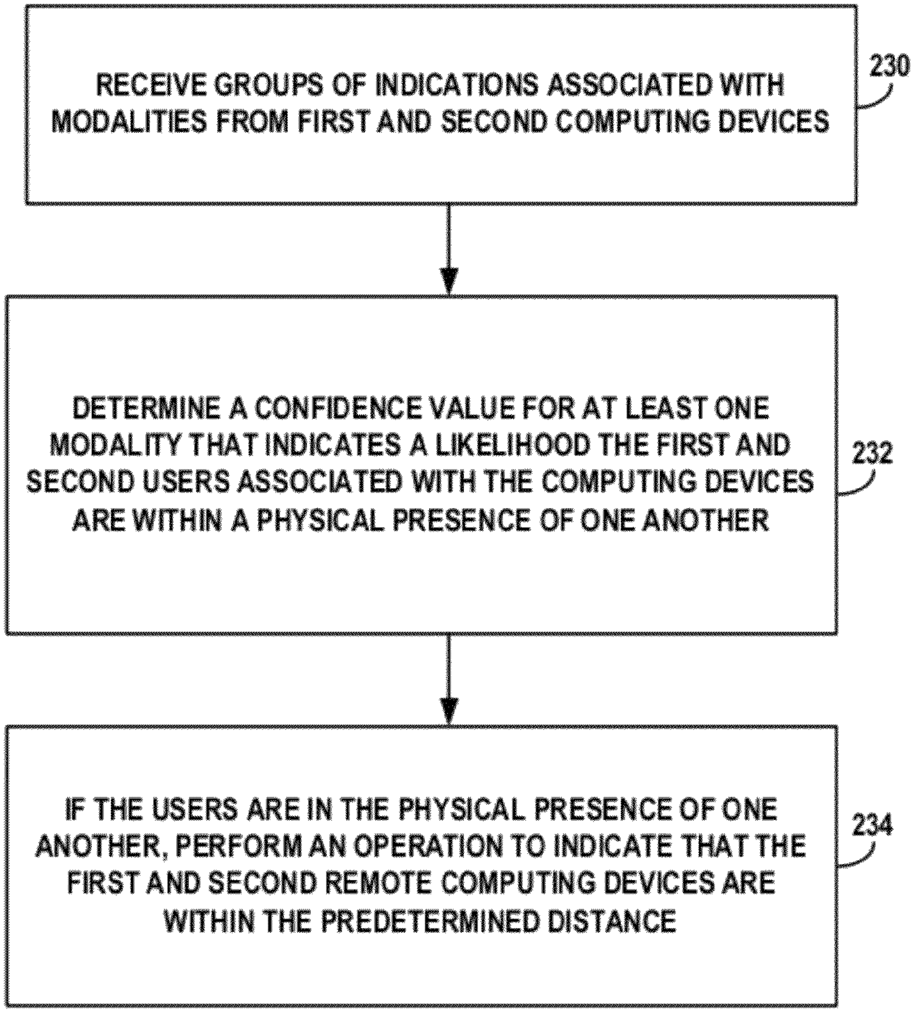
FIG. 7 is a flow diagram illustrating example operations of a computing device to determine whether users associated with computing devices are within a physical presence of one another, in accordance with one or more aspects of this disclosure.

FIG. 7 is a flow diagram illustrating example operations of a computing device to determine whether two or more computers are within a predetermined distance of one another, in accordance with one or more aspects of this disclosure. For purposes of illustration only, the example operations are described below within the context of server device 22 and computing devices 4A and 4B as shown in FIG. 1.

As shown in FIG. 7, server device 22 may receive a first group of indications from computing device 4A that is associated with a first group of modalities (230). Server device 22 may also receive a second group of indications from computing device 4B that is associated with a second group of modalities (230). The groups of modalities may be usable to determine whether users 2A and 2B are within a physical presence of one another.

Server device 22, in some examples, may determine a confidence value for at least one modality of the first or second groups of modalities based at least in part on an indication associated with the at least one modality (230). In some examples, the confidence value may indicate a likelihood that users 2A and 2B are within a physical presence of one another. Server device 22 may further determine that users 2A and 2B are within a physical presence of one another, for example, by determining that the confidence value is greater than a boundary value. Upon determining that users 2A and 2B are within a physical presence of one another, server device 22 may perform an operation to indicate that the computing devices are within the predetermined distance (234).

In one example, the at least one modality is selected from a group consisting of a geoposition modality, an audio fingerprinting modality, a calendar data modality, and a short-range wireless communication modality. In another example, method includes determining, by the at least one computing device, a temporal identifier associated with an indication received from at least the first or second remote computing device, wherein the temporal identifier comprises at least one of a current date and time of the first or second computing device; and determining, by the at least one computing device, at least one event based at least in part on the temporal identifier.

In one example, the method includes receiving, by the at least one computing device, geoposition information associated with an indication received from at least the first or second remote computing device; and determining, by the at least one computing device, the at least one event based on the geoposition information. In another example, the method includes determining, by the at least one computing device, whether the at least one event is indicated in at least one event data source based on at least one of the temporal identifier and the geoposition information; and when the at least one event is indicated in at least one event data source, sending, by the at least one computing device, a message comprising information for display at the first remote computing device that indicates the event. In another example, the at least one event data source is selected from a group consisting of a document, calendar system, web page, email, instant message, and text message.

In one example, the method includes determining, by the at least one computing device, whether an event is indicated in at least one event data source based at least in part on one of the temporal identifier or the geoposition; and when the at least one event is not indicated in at least one event data source, determining, by the at least one computing device, whether to generate data indicating an event based on one or more event criteria; when at least one of the one or more event criteria is satisfied, generating, by the at least one computing device, the data indicating the event; and sending, by the at least one computing device, a message comprising information for display at the first remote computing device that indicates the event.

In another example, the one or more event criteria include: a distance between the first and second remote computing devices; a first frequency that the first and second remote computing devices are within the predetermined distance from one another; a second frequency that the first and second remote computing devices are within the predetermined distance from a geographic location; a third frequency that the first and second remote computing devices are within a predetermined distance at an indicated time; a density within a predetermined area of remote computing devices with at least the first or the second remote computing device; a first group of one or more relationships in a social networking service between a first user associated with the first remote computing device and one or more users associated with the one or more remote computing devices; and a second group of one or more relationships in the social network service between a second user associated with the second remote computing device and the one or more users associated with the one or more remote computing devices.

In one example, a method includes receiving, by the at least one computing device, one or more characteristics that describe the event; and associating, by the at least one computing device, the one or more characteristics with the event. In another example, the method includes in response to determining the at least one event, generating, by the at least one computing device, a social group in a social networking service associated with the event; sending, by the at least one computing device, a request to the first remote computing device to associate a first user with the social group in the social networking service, wherein the first user is associated with the first remote computing device; and in response to receiving a message to associate the first user with the social group, associating, by the at least one computing device, the first user with the social group in the social networking service.

In another example, the method includes in response to determining the at least one event, generating, by the at least one computing device, an event document associated with the event, wherein the event document comprises indications of content associated with the event; sending, by the at least one computing device, a message that indicates the event document to the first remote computing device; receiving, by the at least one computing device, an indication of content to associate with the event document; and in response to receiving the indication, associating, by the at least one computing device, the indicated content with the event document.

In one example, the method includes determining, by the at least one computing device, whether a relationship exists in a social networking service between a third user of the third remote computing device and at least one of a first user of the first remote computing device or a second user of the second remote computing device, wherein the third remote computing device is within the predetermined distance of at least one of the first or second remote computing devices; and when the relationship exists in the social networking service, sending, by the at least one computing device, a message comprising information for display at the third remote computing device that indicates the event.

In another example, the method includes determining, by the at least one computing device, a first user is associated with the first remote computing device and a second user is associated with the second remote computing device; and sending, by the at least one computing device, a message comprising information for display at the first remote computing device that indicates the first user associated with the first remote computing device is within the physical presence of the second user associated with the second remote computing device. In one example, the method includes determining, by the at least one computing device, a degree of similarity between at least one first audio fingerprint of the first remote computing device and at least one second audio fingerprint received from the second remote computing device, wherein the degree of similarity is within a range of degrees of similarity.

In another example, the method includes determining, by the at least one computing device, a margin of error associated with a geoposition of the first remote computing device and a margin of error associated with a geoposition of the second remote computing device. In one example, the method includes in response to determining that the first remote computing device and a third remote computing device are within the predetermined distance, determining, by the at least one computing device, whether a relationship exists in a social networking service between a third user of the third remote computing device and a second user of the second remote computing device; and when the relationship exists between the second and third users, sending, by the at least one computing device, a message to the first computing device to indicate a potential relationship between the first user and the third user.

In one example, the method includes determining, by the at least one computing device, a plurality of confidence values for a plurality of modalities of the first or second groups of modalities, wherein the plurality of confidence values indicate a likelihood that the plurality of modalities indicate whether the first user associated with the first remote computing device is within the physical presence of the second user associated with the second remote computing device. In another example, the method may include storing, by the at least one computing device, log data that indicates the first user associated with the first remote computing device is within the physical presence of the second user associated with the second remote computing device. In one example, the method may include determining, by the at least one computing device, an event attended by at least one of the first user or the second user; and storing, by the at least one computing device, second log data to associated the event with the first log data.

In another example, the method may include receiving, by the at least one computing device, a first message from the first remote computing device to request log data associated with the user, wherein the message comprises a user identifier that identifies the user; retrieving, by the at least one computing device, log data based at least in part on the user identifier; and sending, by the computing device, a second message comprising the log data for display at the first remote computing device. In one example, the method may include determining, by the at least one computing device, that the first user associated with the first remote computing device is within the physical presence of the second user associated with the second remote computing device in accordance with a pattern that indicates a recurring occurrence; generating, by the at least one computing device, an event associated with the pattern; and storing, by the at least one computing device, log data that indicates the event associated with the pattern. In another example, the method may include querying, by the at least one computing device, log data associated with the first user, wherein the log data indicates a plurality of frequencies indicating occurrences when the first user is within a physical presence of users associated with a plurality of remote computing devices.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various embodiments have been described. These and other embodiments are within the scope of the following claims.

What is claimed is:

1. A method comprising:

receiving, by at least one computing device, a first group of indications associated with a first group of modalities and a second group of indications associated with a second group of modalities, wherein the first group of indications is associated with a first remote computing device and the second group of indications is associated with a second remote computing device, and wherein the first and second groups of modalities are usable to determine whether a first user associated with the first remote computing device is within a physical presence of a second user associated with the second remote computing device;

determining, by the at least one computing device, a confidence value for at least one modality of the first or second groups of modalities based at least in part on an indication associated with the at least one modality, the indication being from the first or second group of indications, wherein the confidence value indicates a likelihood that the first user associated with the first remote computing device is within a physical presence of the second user associated with the second remote computing device; and upon determining that the confidence value is greater than a boundary value, performing, by the at least one computing device, an operation to indicate that the first user associated with the first remote computing device is within the physical presence of the second user associated with the second remote computing device.

2. The method of claim 1, wherein the at least one modality is selected from a group consisting of a geoposition modality, an audio fingerprinting modality, a calendar data modality, and a short-range wireless communication modality.

3. The method of claim 1, wherein performing the operation to indicate that the first user associated with the first remote computing device is within the physical presence of the second user associated with the second remote computing device further comprises:

determining, by the at least one computing device, a temporal identifier associated with an indication received from at least the first or second remote computing device, wherein the temporal identifier comprises at least one of a current date and time of the first or second computing device; and determining, by the at least one computing device, at least one event based at least in part on the temporal identifier.

4. The method of claim 3, further comprising:

receiving, by the at least one computing device, geoposition information associated with an indication received from at least the first or second remote computing device; and determining, by the at least one computing device, the at least one event based on the geoposition information.

5. The method of claim 4, wherein determining the at least one event further comprises:

determining, by the at least one computing device, whether the at least one event is indicated in at least one event data source based on at least one of the temporal identifier and the geoposition information; and when the at least one event is indicated in at least one event data source, sending, by the at least one computing device, a message comprising information for display at the first remote computing device that indicates the event.

6. The method of claim 5, wherein the at least one event data source is selected from a group consisting of a document, calendar system, web page, email, instant message, and text message.

7. The method of claim 4, wherein determining at least one event based on the temporal identifier and the geographic information, further comprises:

determining, by the at least one computing device, whether an event is indicated in at least one event data source based at least in part on one of the temporal identifier or the geoposition; and when the at least one event is not indicated in at least one event data source, determining, by the at least one computing device, whether to generate data indicating an event based on one or more event criteria;

when at least one of the one or more event criteria is satisfied, generating, by the at least one computing device, the data indicating the event; and sending, by the at least one computing device, a message comprising information for display at the first remote computing device that indicates the event.

8. The method of claim 7, wherein the one or more event criteria are selected from a group consisting of:

a distance between the first and second remote computing devices;

a first frequency that the first and second remote computing devices are within a predetermined distance from one another;

a second frequency that the first and second remote computing devices are within a predetermined distance from a geographic location;

a third frequency that the first and second remote computing devices are within a predetermined distance at an indicated time;

a density within a predetermined area of remote computing devices with at least the first or the second remote computing device;

a first group of one or more relationships in a social networking service between a first user associated with the first remote computing device and one or more users associated with the one or more remote computing devices; and a second group of one or more relationships in the social network service between a second user associated with the second remote computing device and the one or more users associated with the one or more remote computing devices.

9. The method of claim 3, further comprising:

receiving, by the at least one computing device, one or more characteristics that describe the event; and associating, by the at least one computing device, the one or more characteristics with the event.

10. The method of claim 3, further comprising:

in response to determining the at least one event, generating, by the at least one computing device, a social group in a social networking service associated with the event;

sending, by the at least one computing device, a request to the first remote computing device to associate a first user with the social group in the social networking service, wherein the first user is associated with the first remote computing device; and in response to receiving a message to associate the first user with the social group, associating, by the at least one computing device, the first user with the social group in the social networking service.

11. The method of claim 3, further comprising:

in response to determining the at least one event, generating, by the at least one computing device, an event document associated with the event, wherein the event document comprises indications of content associated with the event;

sending, by the at least one computing device, a message that indicates the event document to the first remote computing device;

receiving, by the at least one computing device, an indication of content to associate with the event document; and in response to receiving the indication, associating, by the at least one computing device, the indicated content with the event document.

12. The method of claim 3, further comprising:

determining, by the at least one computing device, whether a relationship exists in a social networking service between a third user of the third remote computing device and at least one of a first user of the first remote computing device or a second user of the second remote computing device, wherein the third remote computing device is within a predetermined distance of at least one of the first or second remote computing devices; and when the relationship exists in the social networking service, sending, by the at least one computing device, a message comprising information for display at the third remote computing device that indicates the event.

13. The method of claim 1, wherein performing the operation to indicate that the first user associated with the first remote computing device is within the physical presence of the second user associated with the second remote computing device further comprises:

determining, by the at least one computing device, a first user is associated with the first remote computing device and a second user is associated with the second remote computing device; and sending, by the at least one computing device, a message comprising information for display at the first remote computing device that indicates the first user associated with the first remote computing device is within the physical presence of the second user associated with the second remote computing device.

14. The method of claim 1, wherein the at least one modality comprises an audio fingerprint and wherein determining the confidence value further comprises:

determining, by the at least one computing device, a degree of similarity between at least one first audio fingerprint of the first remote computing device and at least one second audio fingerprint received from the second remote computing device, wherein the degree of similarity is within a range of degrees of similarity.

15. The method of claim 1, wherein the at least one modality comprises a geoposition and wherein determining the confidence value further comprises:

determining, by the at least one computing device, a margin of error associated with a geoposition of the first remote computing device and a margin of error associated with a geoposition of the second remote computing device.

16. The method of claim 1, wherein the method further comprises:

in response to determining that the first remote computing device and a third remote computing device are within the predetermined distance, determining, by the at least one computing device, whether a relationship exists in a social networking service between a third user of the third remote computing device and a second user of the second remote computing device; and when the relationship exists between the second and third users, sending, by the at least one computing device, a message to the first computing device to indicate a potential relationship between the first user and the third user.

17. The method of claim 1, further comprising:

determining, by the at least one computing device, a plurality of confidence values for a plurality of modalities of the first or second groups of modalities, wherein the plurality of confidence values indicate a likelihood that the plurality of modalities indicate whether the first user associated with the first remote computing device is within the physical presence of the second user associated with the second remote computing device.

18. The method of claim 1, wherein performing the operation to indicate that the first user associated with the first remote computing device is within the physical presence of the second user associated with the second remote computing device further comprises:

storing, by the at least one computing device, log data that indicates the first user associated with the first remote computing device is within the physical presence of the second user associated with the second remote computing device.

19. The method of claim 18, wherein the log data is first log data, the method further comprising:

determining, by the at least one computing device, an event attended by at least one of the first user or the second user; and storing, by the at least one computing device, second log data to associated the event with the first log data.

20. The method of claim 19, wherein the first remote computing device is associated with a user, the method further comprising:

receiving, by the at least one computing device, a first message from the first remote computing device to request log data associated with the user, wherein the message comprises a user identifier that identifies the user;

retrieving, by the at least one computing device, log data based at least in part on the user identifier; and sending, by the computing device, a second message comprising the log data for display at the first remote computing device.

21. The method of claim 19, wherein the first remote computing device is associated with a first user and a second remote computing device is associated with a second user, the method further comprising:

determining, by the at least one computing device, that the first user associated with the first remote computing device is within the physical presence of the second user associated with the second remote computing device in accordance with a pattern that indicates a recurring occurrence;

generating, by the at least one computing device, an event associated with the pattern; and storing, by the at least one computing device, log data that indicates the event associated with the pattern.

22. The method of claim 19, wherein the first remote computing device is associated with a first user, the method further comprising:

querying, by the at least one computing device, log data associated with the first user, wherein the log data indicates a plurality of frequencies indicating occurrences when the first user is within a physical presence of users associated with a plurality of remote computing devices.

23. A computing device, comprising:

one or more processors; and at least one module operable by the one or more processors to:

receive a first group of indications associated with a first group of modalities and a second group of indications associated with a second group of modalities, wherein the first group of indications is associated with a first remote computing device and the second group of indications is associated with a second remote computing device, and wherein the first and second groups of modalities are usable to determine whether a first user associated with the first remote computing device is within a physical presence of a second user associated with the second remote computing device;

determine a confidence value for at least one modality of the first or second groups of modalities based at least in part on an indication associated with the at least one modality, the indication being from the first or second group of indications, wherein the confidence value indicates a likelihood that the first user associated with the first remote computing device is within a physical presence of the second user associated with the second remote computing device; and upon determining that the confidence value is greater than a boundary value, determine at least one event based at least in part on a temporal identifier associated with an indication received from at least the first or second remote computing device.

24. The computing device of claim 23 wherein the at least one modality is selected from a group consisting of a geoposition modality, an audio fingerprinting modality, a calendar data modality, and a short-range wireless communication modality.

25. The computing device of claim 23, wherein the at least one module is operable by the one or more processors to:

determine a temporal identifier associated with an indication received from at least the first or second remote computing device, wherein the temporal identifier comprises at least one of a current date and time of the first or second computing device; and determine at least one event based at least in part on the temporal identifier.

26. The computing device of claim 25, wherein the at least one module is operable by the one or more processors to:

receive geoposition information associated with an indication received from at least the first or second remote computing device; and determine the at least one event based on the geoposition information.

27. The computing device of claim 25, wherein the at least one module is operable by the one or more processors to:

generate, in response to determining the at least one event, a social group in a social networking service associated with the event;

send a request to the first remote computing device to associate a first user with the social group in the social networking service, wherein the first user is associated with the first remote computing device; and associate, in response to receiving a message to associate the first user with the social group, the first user with the social group in the social networking service.

28. The computing device of claim 25, wherein the at least one module is operable by the one or more processors to:

determine whether a relationship exists in a social networking service between a third user of the third remote computing device and at least one of a first user of the first remote computing device or a second user of the second remote computing device, wherein the third remote computing device is within a predetermined distance of at least one of the first or second remote computing devices; and send, when the relationship exists in the social networking service, a message comprising information for display at the third remote computing device that indicates the event.

29. The computing device of claim 23, wherein the at least one module is operable by the one or more processors to:

determine a degree of similarity between at least one first audio fingerprint of the first remote computing device and at least one second audio fingerprint received from the second remote computing device, wherein the degree of similarity is within a range of degrees of similarity.

30. A computer-readable storage device encoded with instructions that, when executed, cause one or more processors of a first remote computing device to perform operations comprising:

determining a group of indications associated with a group of modalities, wherein the group of modalities is associated with the first remote computing device, and wherein the group of modalities is usable to determine whether a first user associated with the first remote computing device is within a physical presence of a second user associated with the second remote computing device;

sending the group of indications associated with the group of modalities to a server device to determine whether the first user associated with the first remote computing device is within a physical presence of the second user associated with the second remote computing device based at least in part on a confidence value for at least one modality of the group of modalities, wherein the confidence value is based at least in part on an indication included in the group of indications; and receiving a message from the server device that indicates whether the first user associated with the first remote computing device is within a physical presence of the second user associated with the second remote computing device.

* * * * *